United States Patent
Sasaki et al.

(10) Patent No.: US 6,314,375 B1
(45) Date of Patent: Nov. 6, 2001

(54) METHOD AND DEVICE FOR DIAGNOSIS FOR VEHICLE

(75) Inventors: Kazumune Sasaki; Akira Hashimoto, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/147,143
(22) PCT Filed: Mar. 10, 1998
(86) PCT No.: PCT/JP98/00976
§ 371 Date: Apr. 21, 1999
§ 102(e) Date: Apr. 21, 1999
(87) PCT Pub. No.: WO98/40716
PCT Pub. Date: Sep. 17, 1998

(30) Foreign Application Priority Data

Mar. 10, 1997 (JP) ............................................ 9-070909

(51) Int. Cl.⁷ .............................. G01B 3/44; G01B 3/52
(52) U.S. Cl. ........................................... 702/34; 702/185
(58) Field of Search ............................ 702/34, 183, 185, 702/58, 59, 182; 701/33, 35

(56) References Cited

U.S. PATENT DOCUMENTS

| 4,267,569 | 5/1981 | Baumann et al. |
|---|---|---|
| 4,831,560 | * 5/1989 | Zaleski ................................ 701/33 |
| 4,843,557 | 6/1989 | Ina et al. ......................... 364/431.77 |
| 5,214,582 | * 5/1993 | Gray ................................... 701/33 |
| 5,369,581 | 11/1994 | Ohsuga et al. ................. 364/424.01 |
| 5,491,631 | 2/1996 | Shirane et al. ................ 364/424.04 |
| 5,506,773 | * 4/1996 | Takaba et al. ..................... 701/29 |
| 5,532,927 | * 7/1996 | Pink et al. ......................... 701/34 |
| 5,553,488 | 9/1996 | Ishii et al. ........................ 73/116 |
| 5,621,167 | 4/1997 | Fang-Cheng ..................... 73/118.1 |
| 6,006,146 | * 12/1999 | Usui et al. ........................ 701/29 |
| 6,134,488 | * 10/2000 | Sasaki et al. ..................... 701/31 |

FOREIGN PATENT DOCUMENTS 8-164827    6/1996    (JP) .

* cited by examiner

Primary Examiner—Hal Wachsman
Assistant Examiner—Demetrius Pretlow
(74) Attorney, Agent, or Firm—Armstrong, Westerman, Hattori, McLeland & Naughton, LLP

(57) ABSTRACT

A method and device for diagnosing a vehicle, in which a forced activation signal Sx is supplied to a diagnostic target part through an ECU. A current state of the detected diagnostic target part is compared with a state predicted when the forced activation signal Sx is given to diagnose the diagnostic target part. The forced activation signal Sx when the diagnostic target part is judged to be good, or after a predetermined time has elapsed since issue of the signal Sx was initiated.

8 Claims, 15 Drawing Sheets

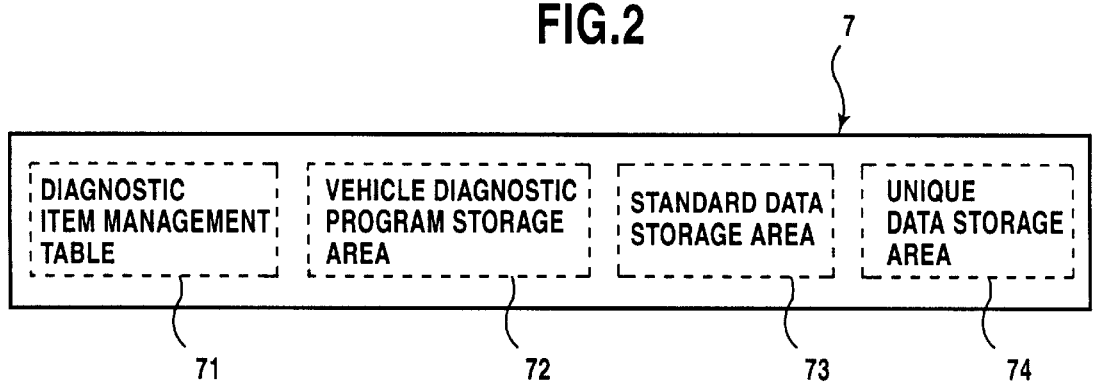

FIG. 5
| CODE NAME | CODE | STANDARD DATA/UNIT |
|---|---|---|
| NUMBER OF TIMES OF IDLING DIAGNOSES | CID-ref | x1 (TIMES) |
| REFERENCE VEHICLE SPEED | VSref | x2 (Km/h) |
| TOLERANCE | NID-TRC | x3 (RPM) |
| REFERENCE IDLING MEASUREMENT TIME | MID-ref | x4 (sec) |
| STANDBY MODE STARTING CONDITION | Tss-ref | x5 (min) |
~73
FIG. 6A
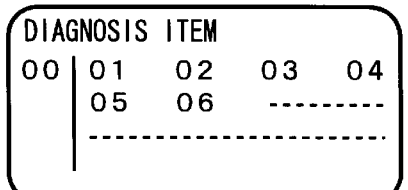
FIG. 6D
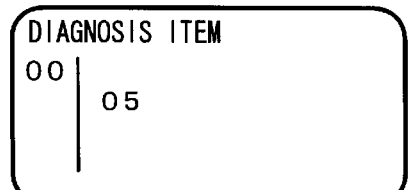
FIG. 6B
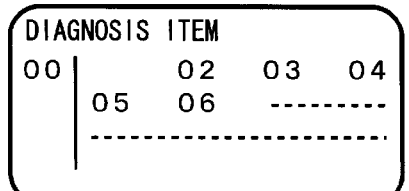
FIG. 6E
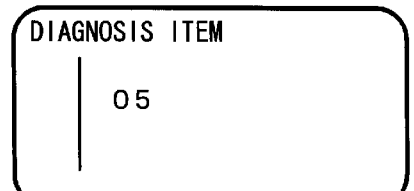
FIG. 6C
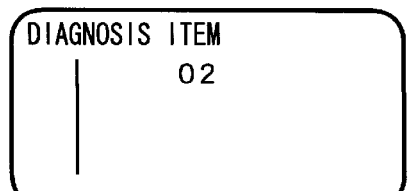
FIG. 6F

F I G. 1 5
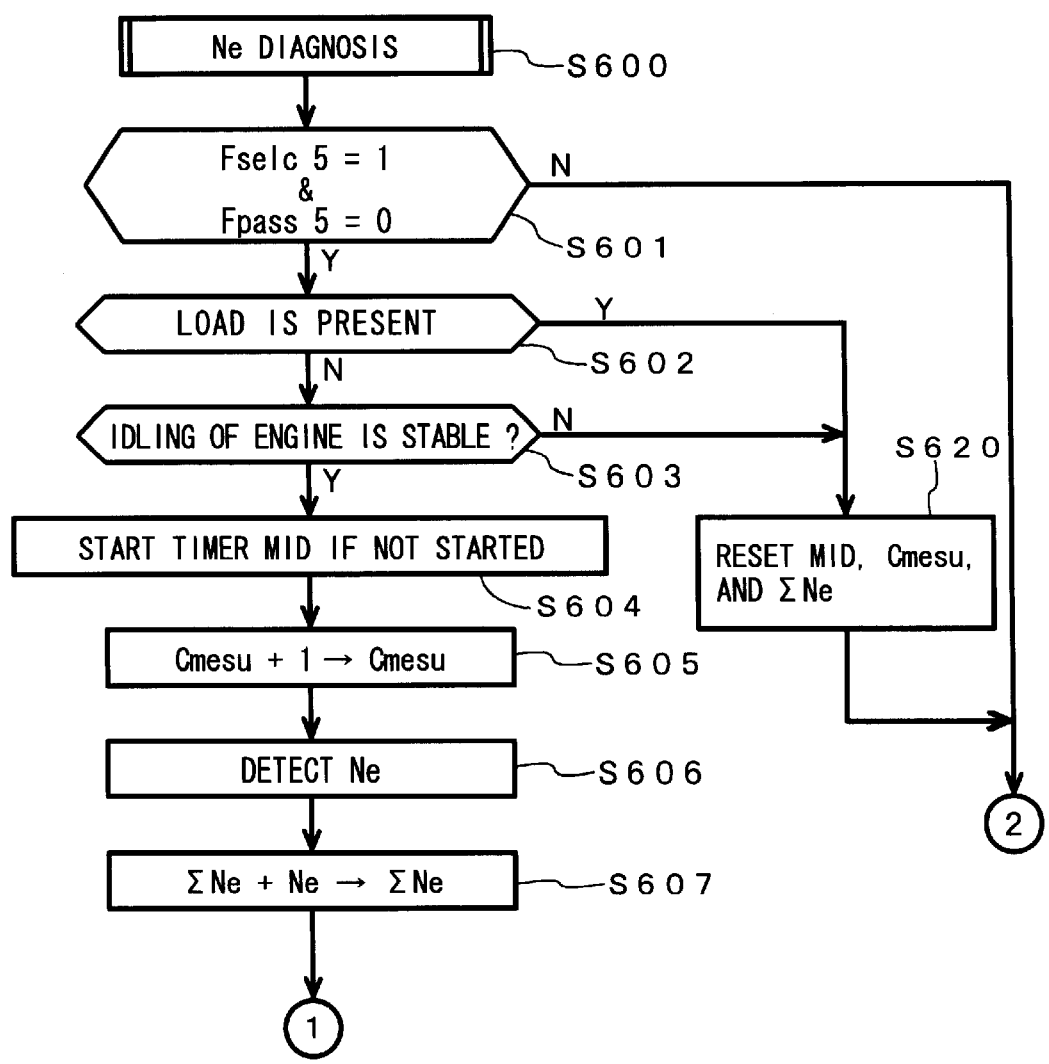

METHOD AND DEVICE FOR DIAGNOSIS FOR VEHICLE

BACKGROUND OF THE INVENTION

1. Field of the Invention

This invention relates to vehicle diagnostic method and an apparatus therefor, and in particular, to the vehicle diagnostic method and apparatus for communicating with an electronic control unit mounted on a vehicle to diagnose the vehicle based on the communication results. More specifically, it relates to the vehicle diagnostic method and apparatus, in which a forced activation signal is issued so that each part of the vehicle will show an expected state, whereby each diagnostic item is judged to be good or bad based on whether or not an actual state of the part is in the expected state.

2. Description of the Related Art

To improve engine control functions, an electronic control unit (ECU) with a microcomputer has been used in recent years for executing control programs, such as control of ignition timing in an engine, control of valve opening and closing timing, and/or control of fuel injection in an electronic fuel injector (EFI) for an automobile (hereinafter, referred to as a "vehicle"). The ECU is connected to sensors, such as a temperature sensor for detecting a temperature of engine cooling water, an engine-speed sensor for detecting an engine speed, a vehicle-speed sensor for detecting a vehicle speed, an 02 sensor for detecting an oxygen concentration in exhaust gas, and various switches including a brake switch for detecting that a driver has stepped on a brake pedal. The ECU thus executes various kinds of controls based on detection signals output from the sensors and others.

On the production line where vehicles with such an ECU are manufactured, in the final test process after assembled, it should be diagnosed whether or not each of sensor and the like, and the ECU itself functions normally. For example, Japanese patent publication No. Hei 3-59372 proposes a diagnostic method in which a diagnostic apparatus with a microcomputer executes a vehicle diagnostic program to diagnose a desired diagnostic item at scheduled timing.

In a failure diagnosis related to a plurality of diagnostic items, for example, as disclosed in Japanese patent publication No. Sho 61-25091, the plurality of diagnostic items are diagnosed in predetermined order and the results of pass/failure or displayed judgment in respective diagnostic items are output one by one on a display device.

Some of such vehicle diagnostic items require particular preconditions. For example, an "Ne Diagnosis" to determine whether or not an engine speed Ne at idling time is in a given range or not must be executed under the condition that the engine has been warmed up adequately. Some other diagnostic items require no precondition and are allowed to complete the diagnosis for an instant, such as a "Brake Switch Diagnosis" to diagnose an opening and closing function of a brake switch.

When such a plurality of diagnostic items are required, the sequence of items to be diagnosed is predetermined in a conventional vehicle diagnostic program. It is therefore impossible to diagnose a subsequent item before the previous item is diagnosed as being passed or failed. If the "Brake Switch Diagnosis" is prearranged to be executed after the "Ne Diagnosis", for example, the operator can not start executing the "Brake Switch Diagnosis" until the "Ne Diagnosis" has been completed after warming up the engine, and is kept waiting wastefully during the execution of the "Ne Diagnosis". This causes long compulsory working-hours of the operator.

To solve such problems, a diagnostic method may be available in which the diagnoses repeatedly circulates in a very short period of each execution cycle regardless of the pass or fail results, so that a diagnostic item or items that remain judged not to be passed after scheduled time has elapsed are diagnosed as being failure. In using such a circulating diagnostic method, the diagnostic period may be set such that one cycle of all the diagnostic processes is completed, for example, while the operator steps on the brake pedal. In this case, the "Brake Switch Diagnosis" is executed without fail while the operator steps on the brake pedal regardless of the sequence and timing of stepping the brake pedal. This makes it possible to reduce limits on the sequence and timing of operations to be performed for each diagnostic item, and hence to improve efficiency of work remarkably.

However, for example, a diagnosis of a function for controlling valve opening and closing timing in accordance with such parameters as the vehicle running speed and the engine speed, and a diagnosis of an evaporation system for collecting fuel gas evaporated from a fuel tank and supplying it to the engine when predetermined operating conditions are satisfied (hereinafter, referred to as an "EVP Diagnosis") are very difficult to be carried out, because it is difficult to realize such running condition in a limited diagnostic process or environment that said function and the evaporation system actually operate. For diagnoses related to such diagnostic items, a diagnostic technique may be available in which the ECU supplies a forced activation (energizing) signal to each associated part to forcibly actuate the valve or evaporation system so as to diagnose it as being good or bad based on whether or not a state actually obtained is in a state predicted corresponding to the forced activation signal.

However, the ECU is not able to issue plural forced activation signals at a time because of its restricted functionality, and the contents and destination of each forced activation signal vary depending on the diagnostic target. Therefore, when plural diagnostic items require respective forced activation signals, it is necessary first to issue a first forced activation signal for a first diagnostic item, and stop the first forced activation signal and then to issue a second forced activation signal for a second diagnostic item after completion of the first diagnosis. Thus, the second forced activation signal cannot be issued until completion of the diagnosis of the first item, and this causes a problem that diagnoses of the other items cannot be executed unless the diagnosis of the first item passes.

Even if only one diagnostic item requires issue of a forced activation signal and the other items do not require such signals, a concentration of the fuel in mixed gas may increase when the evaporation system is forcibly actuated by the forced activation signal. In such a case, if a diagnosis item or items susceptible to the fuel concentration in the mixed gas are included as other diagnostic items, these diagnostic items cannot be diagnosed correctly.

SUMMARY OF THE INVENTION

It is an object of the present invention to provide a vehicle diagnostic method and apparatus capable of execution of good diagnoses even when diagnostic items requiring respective forced activation signals are used in the above-discussed circulating diagnostic method.

The present invention provides vehicle diagnostic method and apparatus, in which a forced activation signal is issued so that each part of a vehicle will show an expected state, whereby each diagnostic item is judged to be good or bad based on whether or not an actual state of the part is in the expected state. The vehicle diagnostic method and apparatus are characterized as follows.

(1) The vehicle diagnostic method comprises the steps of supplying each associated part with a forced activation signal that is predicted to actuate each part related to each diagnostic item to be a predetermined state; circulating execution of a diagnosis for each diagnostic item corresponding to the forced activation signal while being supplied; removing a diagnostic item having been judged to be good from diagnostic targets during the circulating process while continuously circulating execution of diagnoses for remaining diagnostic items; and stopping the forced activation signal either when the corresponding item is judged to be good or when scheduled time for execution of the diagnosis has elapsed.

The diagnostic apparatus circulating execution of diagnoses for plural items, in which a diagnostic item or items that have been judged to be passed are removed in order from diagnostic targets while continuously circulating execution of diagnoses for remaining items, said apparatus comprises diagnostic-item selection means for selecting a diagnostic item out of plural diagnostic items consecutively one-by-one for given cycles; state detection means for detecting a current state of a diagnostic target part related to the selected diagnostic item; diagnostic means for comparing the detected current state of the diagnostic target part with an expected state to judge the diagnostic target part to be good when both states accord or an expected relation is established therebetween; forced activation signal supplying means for issuing a forced activation signal to actuate a diagnostic target part related to at least one predetermined diagnostic item to be an expected state; and supply stopping means for stopping issue of the forced activation signal either when judging that the diagnostic target part corresponding to the force deactivation signal has passed the diagnosis, or after the forced activation signal is continuously issued to the diagnostic target part for a predetermined period of time.

According to the vehicle diagnostic method and apparatus thus configured, issue of a forced activation signal associated with a particular diagnostic item can be stopped not only when the particular diagnostic item is passed, but also after the forced activation signal has been issued for a predetermined period of time, thereby preventing the forced activation signal for the particular diagnostic item from being continuously issued, and hence from hindering diagnoses for the other items.

BRIEF DESCRIPTION OF DRAWINGS

FIG. 2 is a schematic diagram showing the contents of a ROM card 7;

FIG. 3 is a diagram showing the contents of a diagnostic item management table 71;

FIG. 4 is a diagram showing the contents of a unique data storage area 74;

FIG. 5 is a diagram showing the contents of a standard data storage area 73;

FIGS. 6A–F are diagrams each showing exemplary results of diagnosis indicated on a display 27;

FIGS. 15 and 16 show a flowchart of an Ne diagnosis when combined each other.

DETAILED DESCRIPTION OF THE PREFERRED EMBODIMENTS

BEST MODE FOR EMBODYING THE INVENTION

Figure 1:
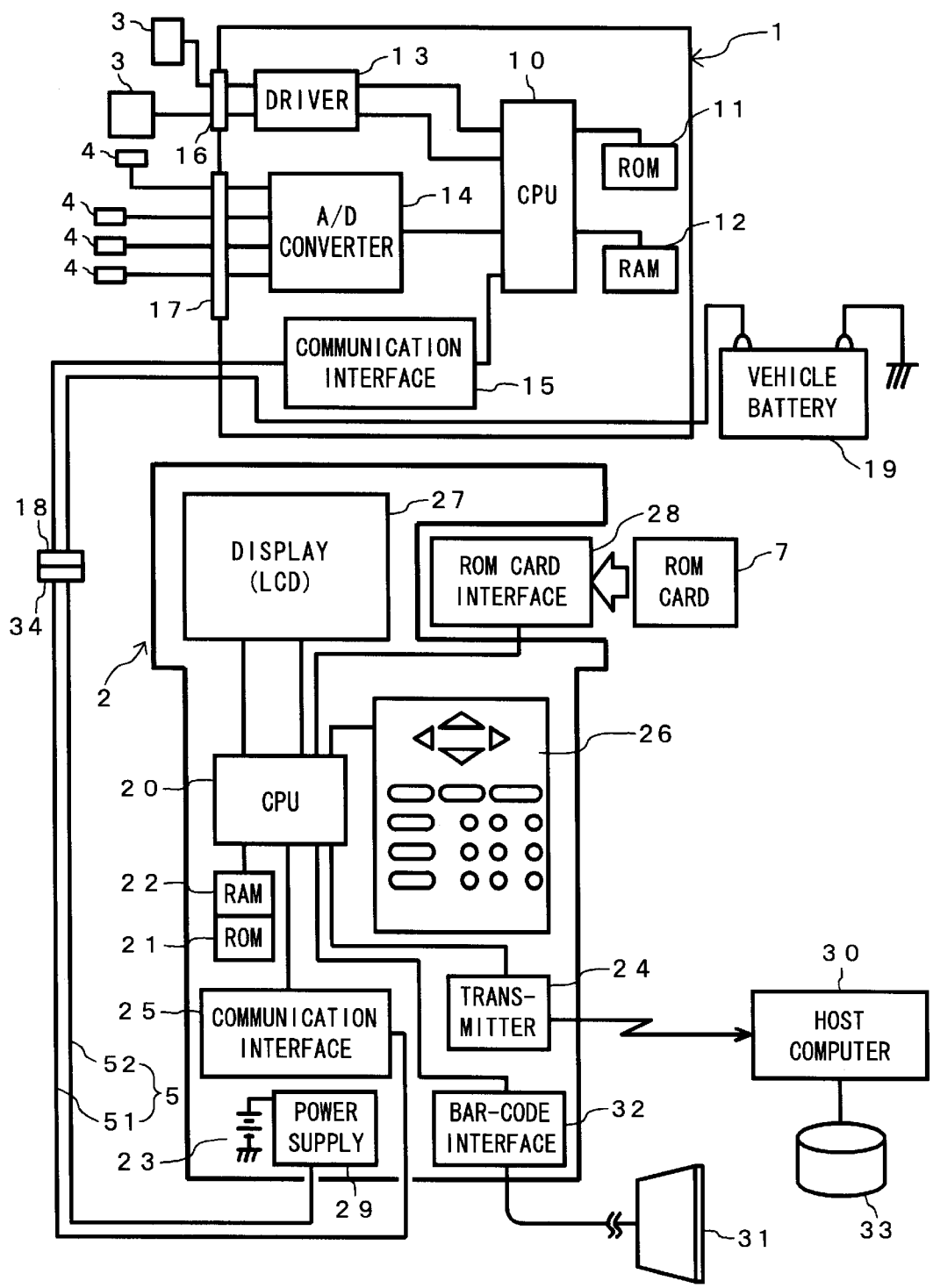
FIG. 1 is a block diagram showing a configuration of an ECU 1 mounted on a vehicle to be diagnosed and a vehicle diagnostic apparatus 2 according to the present invention.

Referring now to the drawings, the present invention will be described in detail below.

In FIG. 1, the ECU 1 is constituted of a CPU 10, a ROM 11, a RAM 12, a driver 13, an A/D converter 14, and a communication interface 15. The ECU 1 is connected to peripherals devices through connectors 16 and 17. For example, actuators 3 are connected with the connector 16, while various types of sensors and switches 4 are connected with the connector 17. The ECU 1 is also connected by a connector 18 to a communication cable 5 of the vehicle diagnostic apparatus 2 through a connector 34.

Signals from each sensor 4 or the like are input to the ECU 1. In the ECU 1, the signals are converted by the A/D converter 14 into digital signals and read into the CPU 10. The signals read in the CPU 10 are processed with control data stored in the ROM 11 and the RAM 12 according to a control program stored in the ROM 11. The CPU 10 provides a command signal to the driver 13 in accordance with the processing result. The driver 13 provides power for each actuator 3 in response to the command signal input. The ROM 11 stores not only the program but also identification codes or ECU codes assigned to each individual ECU 1.

The vehicle diagnostic apparatus 2 according to the present invention is constituted of a CPU 20, a ROM 21, a RAM 22, a transmitter 24, a communication interface 25, and a power source 29. By the power supply 29, either a vehicle battery 19 mounted on the vehicle to be diagnosed or an internal battery 23 is selected as a power supply of the vehicle diagnostic apparatus 2. The vehicle diagnostic apparatus 2 is also provided with a keyboard 26 for input of operator's instructions, a display 27 for displaying processing results of the CPU 20, a bar-code reader 31 for reading identification bar-codes, and a bar-code interface 32. In the present embodiment, a back-lighted liquid crystal display panel (LCD) is used as the display 27. Further, the keyboard 26 includes typical ten keys, cursor navigation keys, and some function keys.

The communication cable 5 is constituted of a signal line 51 and a power-supply line 52. The communication interface 15 of the ECU 1 and the communication interface 25 of the vehicle diagnostic apparatus 2 are connected through the signal line 51 so that two-way digital communications can be established between the CPU 10 and the CPU 20. When connecting the communication cable 5 to the ECU 1, the power supply 29 provides the vehicle diagnostic apparatus 2 with power supplied by the vehicle battery 19 through the power-supply line 52, and simultaneously charges the internal battery 23.

As described later in detail, the vehicle diagnostic apparatus 2 is started or activated by the operator turning on a power supply key switch (not shown) on the keyboard 26, or connecting a connector 34 of the communication cable 5 to the connector 18 of the ECU 1 without operation of the power supply key switch. The vehicle diagnostic apparatus 2 after activated acts in different ways depending on which starting operation is done by the operator.

The ROM 21 stores a basic program for controlling the vehicle diagnostic apparatus 2, and associated control data. On the other hand, the ROM card 7 stores individual information to which a new information may be added and or which may be changed when manufacture a new type of car or the like, such as unique data used for each diagnosis routine and the vehicle diagnostic program. Data of the ROM card 7 are read into the CPU 20 through a ROM card interface 28.

Signals read from the ECU 1 are processed based on the basic data stored in the ROM 21 and the RAM 22, and the control data and the vehicle diagnostic program stored in the ROM card 7. The processing results, that is, the diagnostic results are temporarily stored into the RAM 22. The diagnostic results are output to the display 27 whenever the diagnosis of each vehicle is finished. The operator then causes the vehicle diagnostic apparatus 2 to transmit the data on the diagnostic results of several vehicles from the transmitter 24 to a host machine, such as a host computer 30, so as to be centrally controlled by the host computer 30 and stored in a mass storage device 33. Otherwise, the vehicle diagnostic apparatus 2 may be connected to an unillustrated personal computer that provides necessary information, such as an updated (version-up) failure diagnostic program, to the vehicle diagnostic apparatus 2.

As shown in FIG. 2, the ROM card 7 contains a diagnostic item management table 71 for use to select diagnostic items unique to engine type according to the ECU code, a vehicle diagnostic program storage area 72 for storing a vehicle diagnostic program related to a plurality of diagnostic items, a standard data storage area 73 for storing standard data commonly used for a plurality types of the vehicles irrespective of the type of the ECU mounted thereon, and a unique data storage area 74 for storing unique data the contents of which may vary according to each individual ECU.

FIG. 3 shows exemplary contents of the diagnostic item management table 71. The vehicle diagnostic apparatus 2 according to the present invention is able to diagnose various diagnostic items. Although the vehicle diagnostic apparatus 2 includes all algorithms for respective diagnostic items, since all of the items are not always diagnosed for every vehicles, that is, since the items to be diagnosed for each vehicle are usually different, each item in the management table 71 has an entry "1 (selected)" or "0 (not-selected)" for each ECU code. As an example, for a vehicle having an ECU code "○△×□" in FIG. 3, diagnostic items 1, 2, 5, 6, . . . are selectively diagnosed and the other items are not diagnosed.

FIG. 4 shows the contents of the unique data storage area 74. In the present embodiment, the unique data storage area stores unique data the contents of which may vary according to each individual ECU (ECU code), such as an individual reference idling speed NID-ref registered in accordance with each individual ECU code. As described later in detail, the individual idling speed NID-ref denotes a reference engine speed or RPM when the engine is idling, which varies according to each individual ECU code. Therefore, the individual idling speed NID-ref relative to the individual ECU code of the vehicle to be diagnosed is compared with a detected engine speed Ne to diagnose whether the engine speed in the idling state is normal or abnormal.

In the present embodiment, different diagnostic routines, that is, a combination of diagnostic items, and associated unique data are automatically determined according to each individual ECU code, so that the operator is released from selecting operation of the diagnostic items and setting operation of the unique data. This reduces the operator load; besides, it increases the accuracy of each diagnosis because an error in selection of the diagnostic items and unique data is eliminated.

FIG. 5 shows the contents of the standard data storage area 73. The standard data storage area 73 contains standard data x1 to x5 commonly used in respective diagnostic processings of the diagnostic program irrespective of the ECU code.

Figure 8:
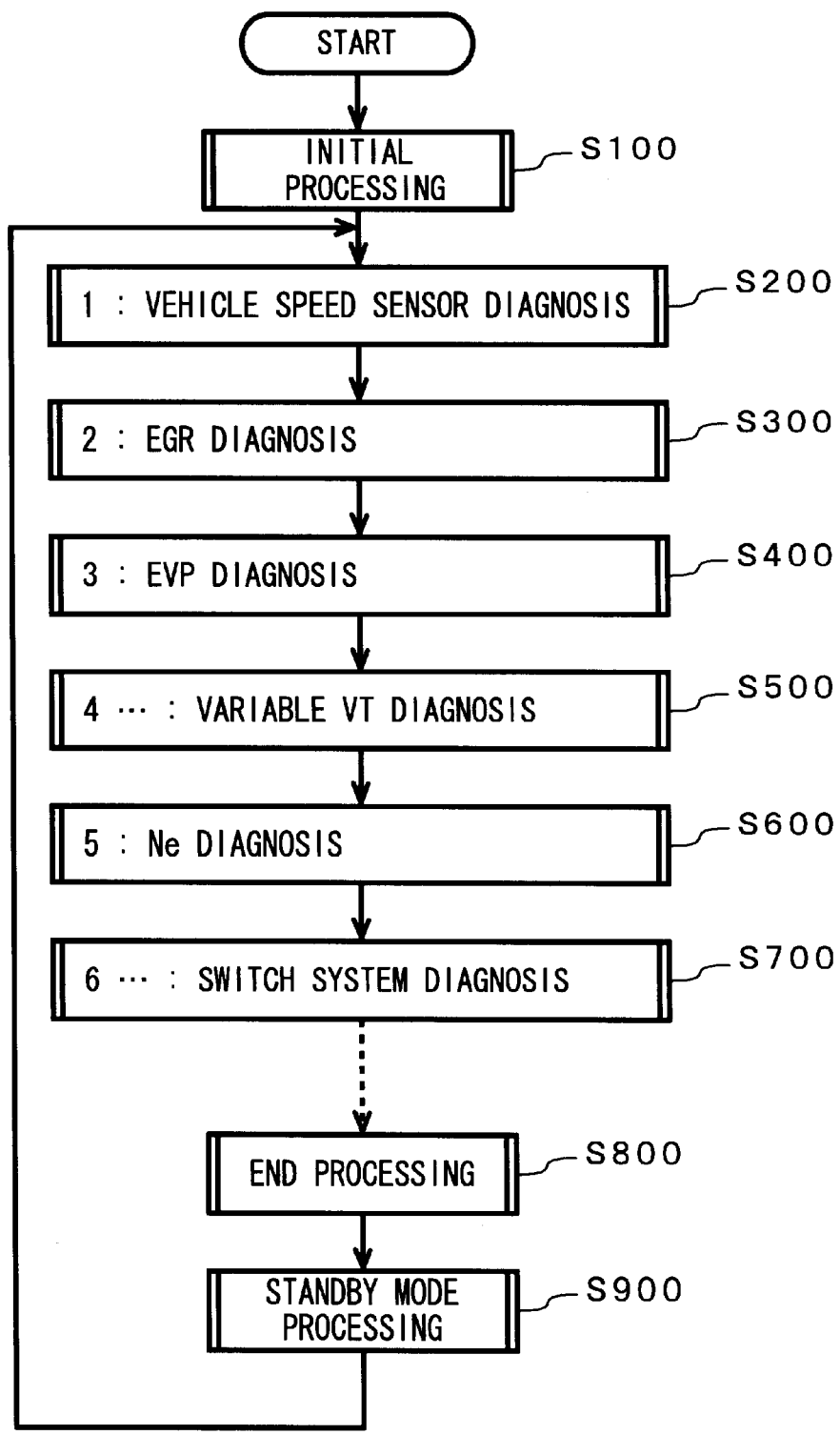
FIG. 8 is a flowchart showing a main flow of a vehicle diagnostic program according to the present invention.

Next, operation of the present embodiment will be described with reference to flowcharts. FIG. 8 is a flowchart showing a main flow of a vehicle diagnostic program executed by the vehicle diagnostic apparatus according to the present invention. Although the vehicle diagnostic apparatus according to the present invention can be used for vehicle diagnosis under any environments, such as on the production line or at an auto repair shop, the present embodiment takes a case in which the "Inspection Process" is executed on the production line at a factory, by way of example to describe its operation.

In FIG. 8, step S100 executes an "Initial Processing". Step S200 executes a "Vehicle Speed Sensor Diagnosis" registered as a diagnostic item 1. Step S300 executes an "EGR (Exhaust Gas Recirculator) Diagnosis" registered as a diagnostic item 2. Step S400 executes an "EVP (Evaporation) Diagnosis" registered as a diagnostic item 3. Step S500 executes a "variable VT (Valve Timing) Diagnosis" registered as a diagnostic item 4. Step S600 executes an "Ne Diagnosis" registered as a diagnostic item 5. Step S700 executes a "Switch System Diagnosis", in which each of switches registered as diagnostic items 6, 7, . . . are diagnosed. Step S800 executes an "End Processing" and step S900 executes a "Standby Mode Processing". After the step S900, the program returns to the step S200 and the sequence of every diagnosis routines is repeated until all the diagnostic items are concluded, or until the process is stopped with a command of an operator or the like.

The vehicle diagnostic apparatus according to the present invention is thus designed to repeat a plurality of diagnoses related to various diagnostic items automatically during given execution cycles. Hereinbelow, each diagnostic method and processing method of each items will be described in detail.

Figure 9:
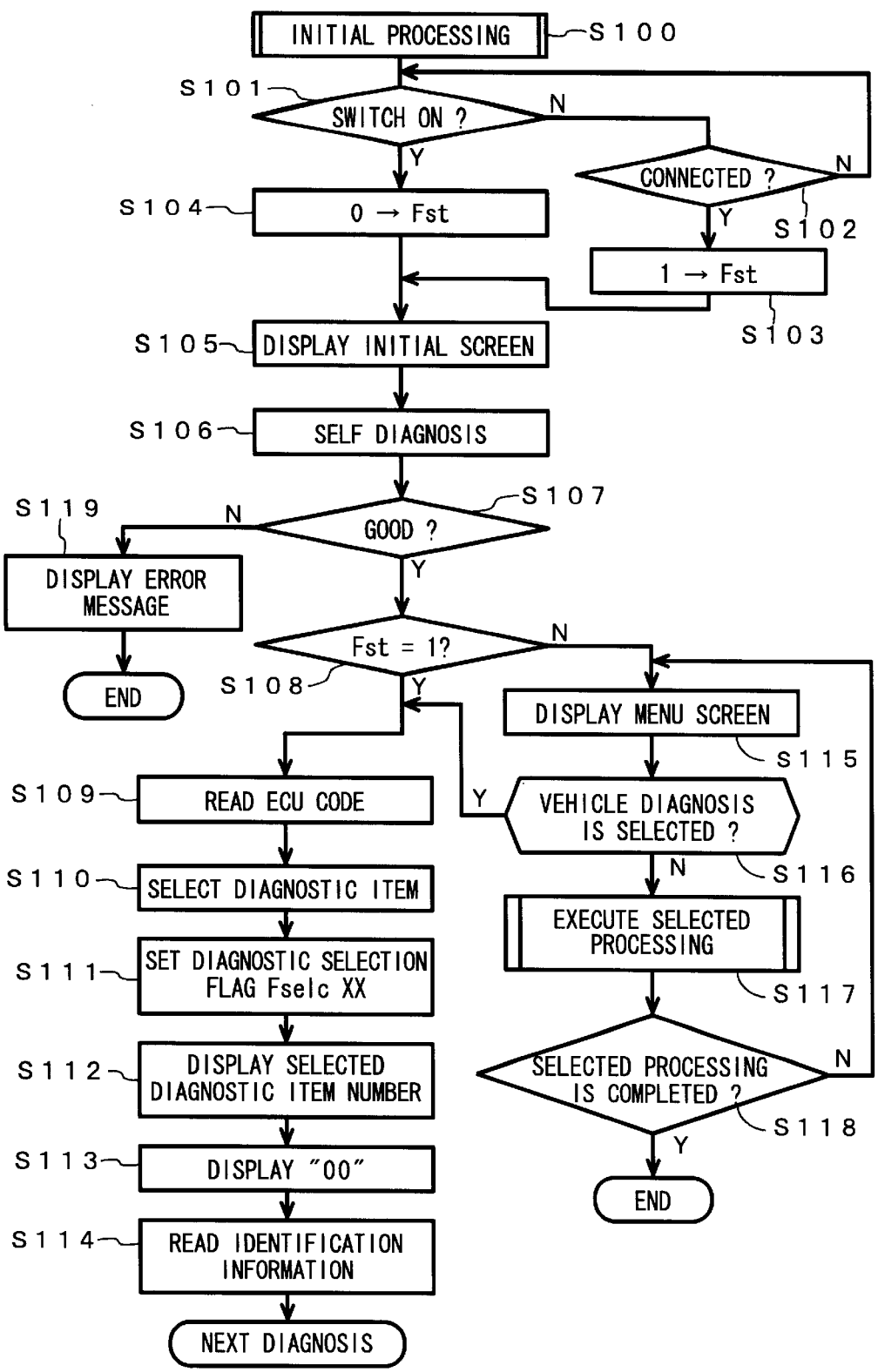
FIG. 9 is a flowchart showing an operation of an initial processing.

FIG. 9 is a flowchart showing an operation of the "Initial Processing" in step S100. As previously described, the vehicle diagnostic apparatus 2 according to the present invention is started or activated by the operator either turning on a power-supply switch on the keyboard 26, or connecting the communication cable 5 to the ECU 1. Therefore, the initial processing first determines which procedure is used for the power input.

Step S101 in FIG.9 determines whether or not the power is supplied to the vehicle diagnostic apparatus 2 by turning on the power-supply switch. If the judgement is affirmative, a flag Fst representing a power-on procedure is set to "1" in step S104. In this case, the internal battery 23 provides power for the vehicle diagnostic apparatus 2. If the judgement at step S104 is negative, step S102 determines whether or not the communication cable 5 has been connected to the vehicle (ECU 1). If it is affirmative, the flag Fst is set to "1" in step S103. In this case, the vehicle battery 19 provides power for the vehicle diagnostic apparatus 2.

When detecting either the power input by the switch or the power input by the cable connection, step S105 makes the display 27 show an initial image on its screen. Then, step S106 executes a self diagnosis for checking the abnormality or failure of the vehicle diagnostic apparatus 2 itself. When the result of the self-diagnosis is judged in step S107 to be passed, the program advances to step S108. If judged to be bad, step S119 makes the display 27 indicate an error message and the processing halts.

The step S108 checks the flag Fst to determine whether the subsequent processing to be executed should be selected by the operator from the menu image, or a predetermined, specific processing should automatically be executed. In the case where the flag Fst is "1", i.e., the power has been supplied by the cable connection, the "Vehicle Diagnosis" as predetermined particular process is started immediately according to the predetermined program without showing the menu screen on the display 27. The program then advances to step S109, in which the ECU code registered in the ECU 1 is read. Step S110 retrieves the diagnostic item management table 71, previously discussed with reference to FIG. 3, based on the ECU code thus read out, to select diagnostic items to be executed. Step S111 sets "1 (select)" as diagnostic selection flags Fselc XX (where "XX" is any one of diagnostic item numbers) for each selected diagnostic items, while for "(non-select)" for each non-selected diagnostic items.

Step S112 makes the display 27 show a list of the diagnostic item numbers representing the selected diagnostic items. FIG. 6A shows an exemplary image displayed screen on the display 27 when all the diagnostic items have been selected. In other words, FIG. 6A shows all the diagnostic item numbers "01", "02", "03", . . . listed up on the display 27. An indication (left side) of "00" is displayed on the display in the next step S113, and erased when the number of cycle times of the diagnoses or a total time of its execution is enough to finish the diagnostic item 5 of "Ne Diagnosis", as described later in detail. Such an indication is not limited by the number "00", but any alpha numerical letter such as "X" or any other symbol may be used instead of the number "00" as long as it can easily be distinguished from the other diagnostic item numbers.

In step S114, an identification bar code representing an individual and unique information of each vehicle is read by the bar-code reader 31 and temporarily stored in the RAM 22. The identification bar code may be previously printed on a diagnostic record that is provided for each individual vehicle. The bar code may be printed on a label or seal which is to be attached in place to the body of each vehicle instead of printing bar-code on the diagnostic record. Then the processing advances to the next diagnosis that is the "Vehicle Speed Sensor Diagnosis" shown in FIG. 8.

When the flag Fst is set to "0" in the step S108, i.e., when the step S108 determines that the operator has turned on the switch to provide power for the vehicle diagnostic apparatus 2, step S115 makes the display 27 show a menu that requests the operator to select the processing contents. Step S116 identifies the processing contents selected by the operator from the menu. When a "Vehicle Diagnosis" command is selected in step S116, the program advances to the step S109 and the diagnostic processing is started in the same manner as the case the flag Fst is set to "1". When a processing command other than the "Vehicle Diagnosis" command is selected in step S116, step S117 executes the selected other processing. Step S118 determines whether or not an "End" command is selected in the step S116. If the "End" command has been selected, the program executed is ended.

As previously described, the vehicle diagnostic apparatus 2 according to the present invention is designed to vary the operation after power input depending on which power-on procedure is used, the operation of the power switch or the cable connection. When the source power is supplied by the cable connection, the diagnostic processing is started immediately without showing the menu. This allows the operator to start the vehicle diagnostic program automatically in the inspection process, where vehicles to be diagnosed are carried on the production line one after another, by only connecting the cable 5 of the vehicle diagnostic apparatus 2 to each vehicle to be diagnosed, thus simplifying the diagnostic work. On the other hand, when the starting of the vehicle diagnostic apparatus 2 is done by the operator turning on the switch, the menu is displayed on the screen to facilitate the selection of any other processing.

Figure 10:
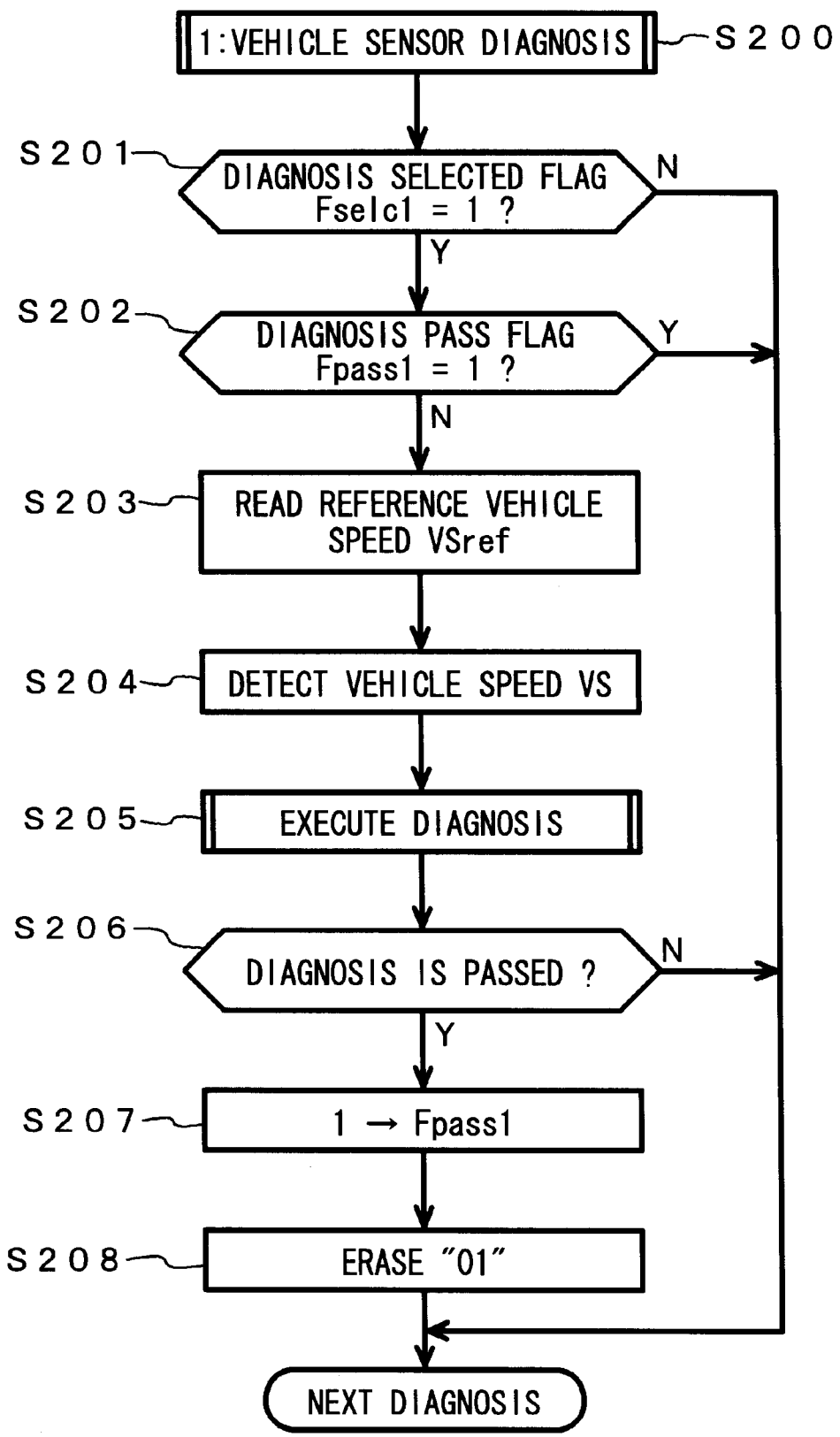
FIG. 10 is a flowchart showing an operation of a vehicle-speed sensor diagnosis.

FIG. 10 is a flowchart showing a method of the diagnostic item 1 "Vehicle Speed Sensor Diagnosis" to be executed by the step S200 of FIG. 8. The "Vehicle Speed Sensor Diagnosis" routine is to diagnose whether or not the sensor for detecting a vehicle speed VS is functioning normally, in which the vehicle speed VS detected by the vehicle speed sensor is compared with a reference value (reference vehicle speed VSref) to diagnose the vehicle speed sensor in a proper known manner in accordance with the comparison result.

Step S201 first determines whether or not the "Vehicle Speed Sensor Diagnosis" routine has been selected based on the value of a diagnostic selection flag Fselc 1 related to the "Vehicle Speed Sensor Diagnosis" routine.

If Fselc 1=0, the "Vehicle Speed Sensor Diagnosis" is judged to be non-selected and the program advances to the next diagnosis. If Fselc 1=1, the "Vehicle Speed Sensor Diagnosis" is judged to be selected and the program advances to step S202.

The step S202 determines whether or not the "Vehicle Speed Sensor Diagnosis" has already been passed on the basis of the value of a pass flag Fpass 1 related to said diagnosis . The flag Fpass XX represents whether the diagnostic item XX has been passed or failed. If Fpass 1=1, the diagnostic item 1 is judged to have been passed and the program advances the next diagnosis item. If Fpass 1=0, the diagnostic item 1 is judged not to have been passed yet and the program advances to step S203.

Step S203 reads the reference vehicle speed VSref stored as one of standard data stored in the standard data storage area 73 (FIG. 5) of the ROM card 7, and step S204 detects a current vehicle speed VS through the ECU 1. Step S205 executes the vehicle speed sensor diagnostic routine based on the reference vehicle speed VSref and the detected vehicle speed VS. Step S206 determines whether or not the diagnosis executed in the step S205 is passed. If not passed, the program advances to the next diagnosis item (the "EGR Diagnosis" in the present embodiment) according to the flowchart shown in FIG. 8, and the "Vehicle Speed Sensor Diagnosis" routine is held off until the next diagnostic timing therefor.

If passed, on the other hand, step S207 sets the diagnosis pass flag Fpass 1 to "1". Step S208 erases the diagnostic item number "01" from the display 27. FIG. 6B shows an exemplary image displayed on the display 27 when only the "Vehicle Speed Sensor Diagnosis" has been passed, where only the diagnostic item number "01" has been erased.

Figure 11:
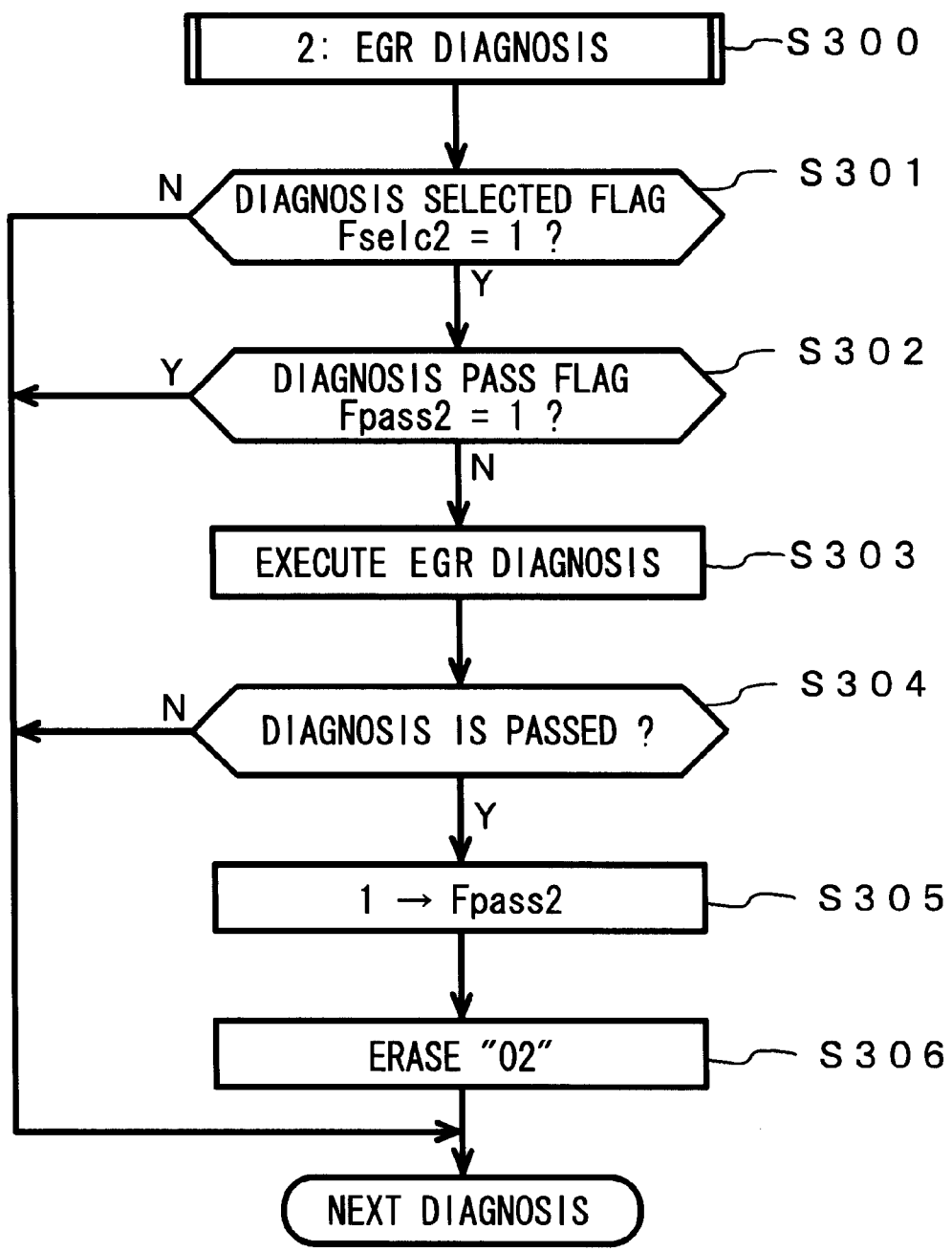
FIG. 11 is a flowchart showing an operation of an EGR diagnosis.

FIG. 11 is a flowchart showing a method of the diagnostic item 2 "EGR Diagnosis" to be executed by the step S300 of FIG. 8. The "EGR Diagnosis" routine is to decide whether or not a device (EGR) to reduce NOx by recirculating exhaust gas into a combustion chamber of the engine normally functions. Such kind of diagnostic technique is well known in the related art.

As similar to the diagnostic processing mentioned above, steps S301 and S302 determine whether or not the diagnostic item 2 has been selected and the diagnosis has been passed based on the values of the diagnostic selection flag Fselc 2 and the diagnostic pass flag Fpass 2 related to the "EGR Diagnosis". If the "EGR Diagnosis" is selected (Fselc 2=1) but not yet be passed (Fpass 2=0), step S303 executes the "EGR Diagnosis" routine in a proper known manner. If step S304 judges the diagnosis to be passed, step S305 sets the diagnostic pass flag Fpass 2 to "1", and step S306 erases the diagnostic item number "02" from the display 27. On the other hand, if not be passed yet, the program advances to the next diagnostic item (the "EVP Diagnosis" in this embodiment) along the flowchart of FIG. 8, and the "EGR Diagnosis" routine is held off until the next diagnostic timing therefor.

Figure 7:
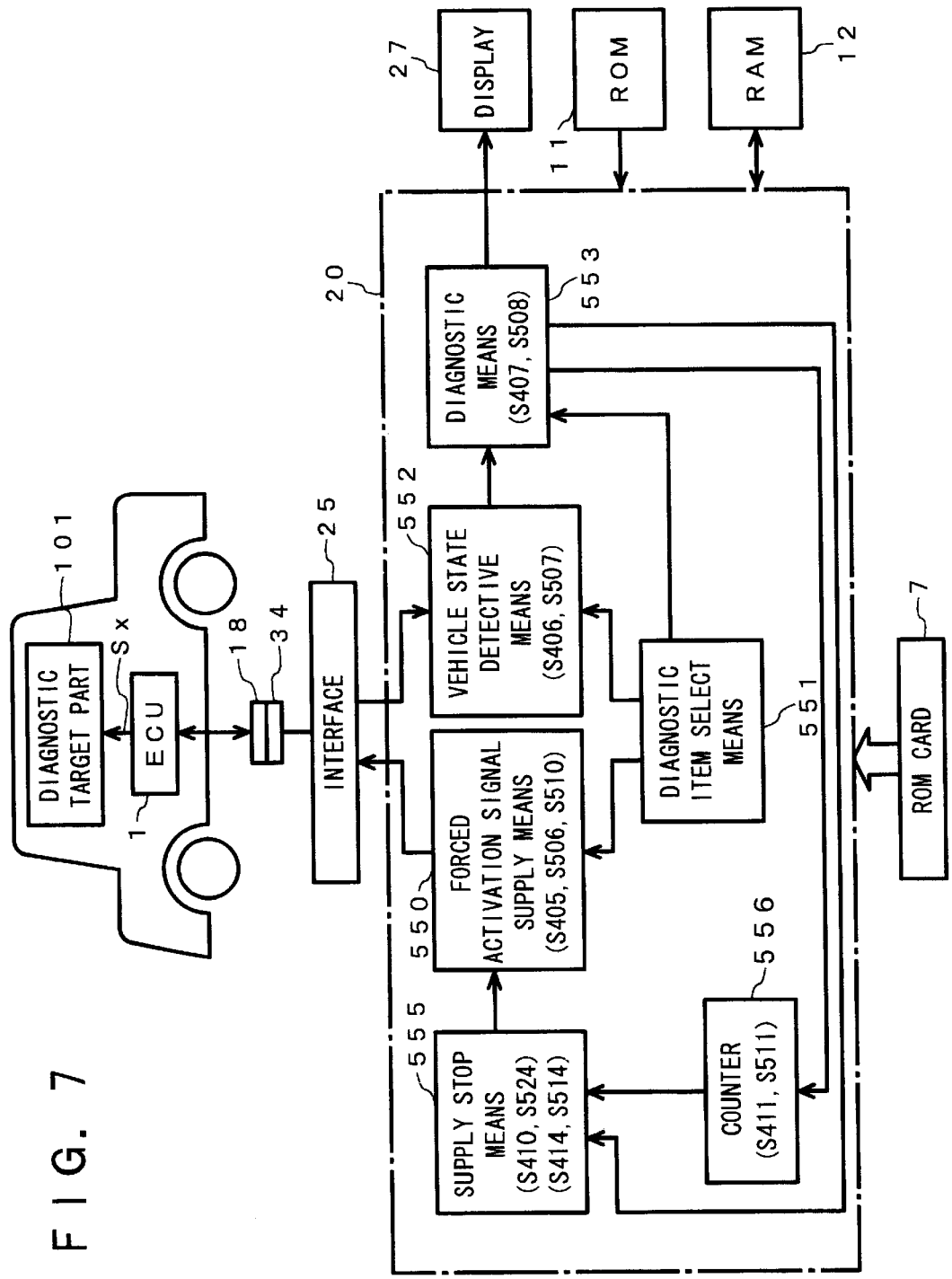
FIG. 7 is a functional block diagram of the vehicle diagnostic apparatus according to the present invention.
Figure 12:
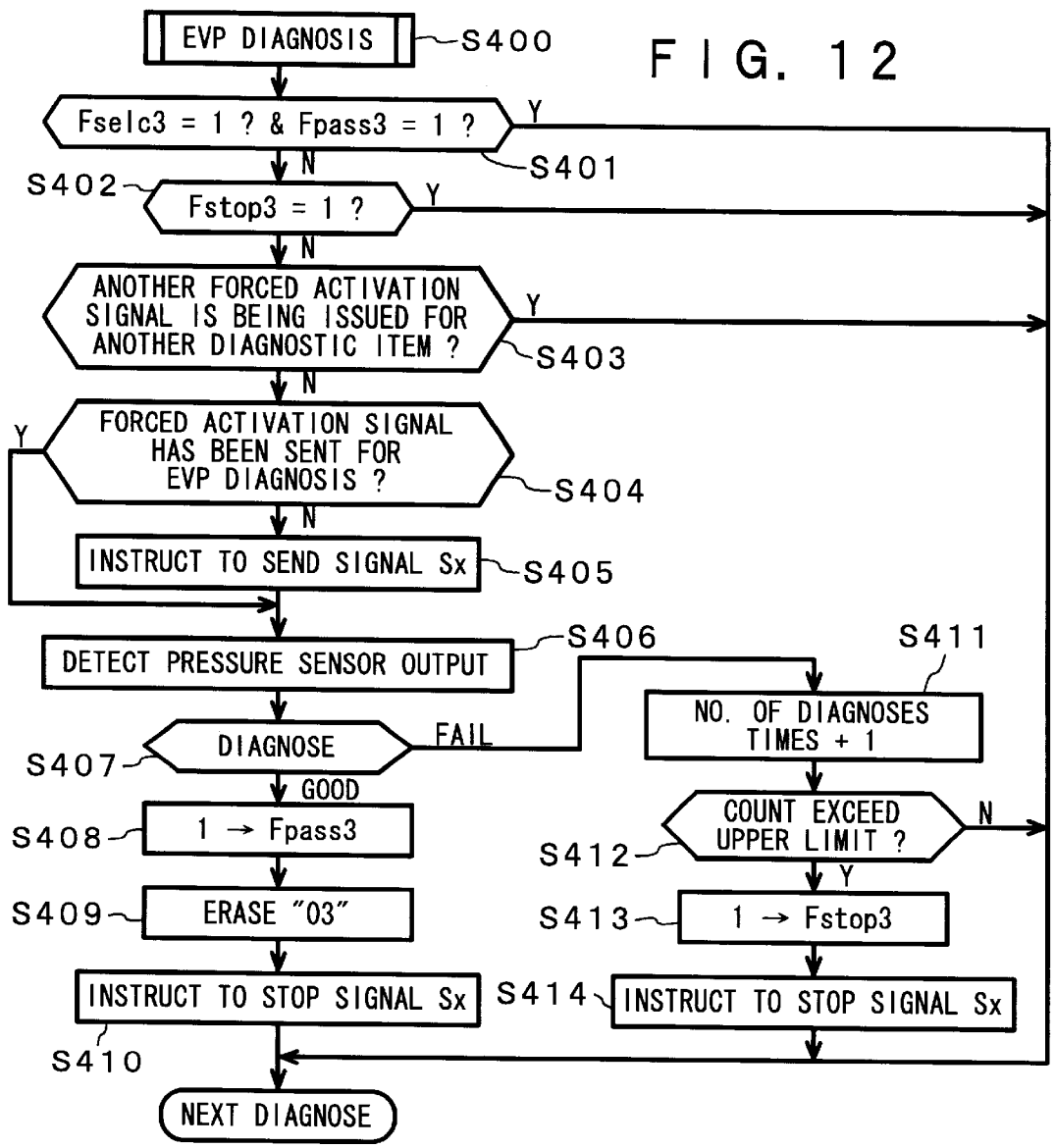
FIG. 12 is a flowchart showing an operation of an EVP diagnosis.
Figure 14:
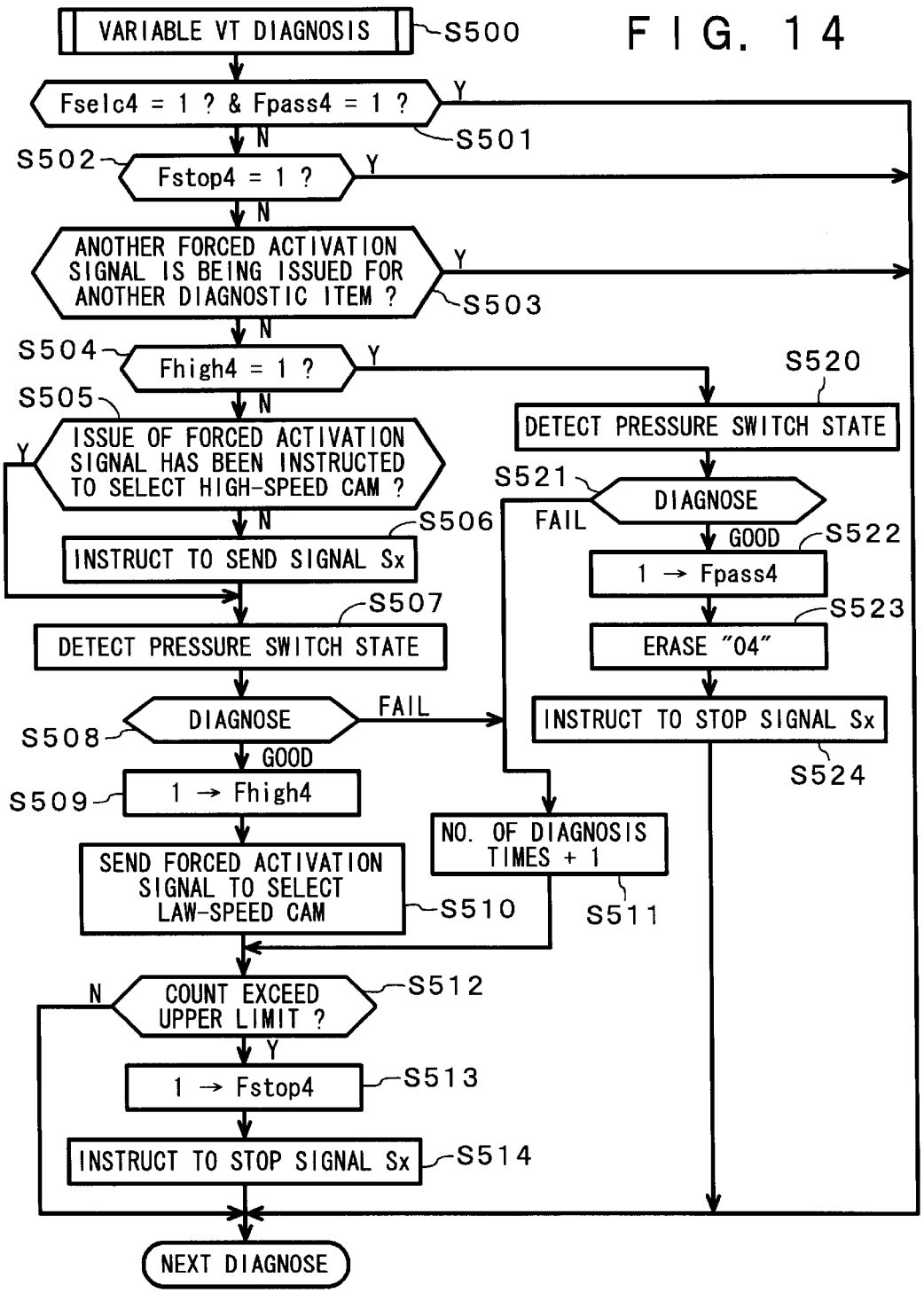
FIG. 14 is a flowchart showing an operation of a VT diagnosis.

FIGS. 12 and 14 are flowcharts showing methods of "EVP Diagnosis" and "Variable VT Diagnosis" executed by the steps S400 and S500, respectively. These diagnoses are executed in a specific manner according to the present invention, which use forced activation signals, respectively. FIG. 7 is a functional block diagram for carrying out each vehicle diagnosis according to the present invention, in which like numbers represent identical or equivalent functional blocks, and step numbers given in each block correspond to those given in flowcharts, indicating the contents of processing to be executed by each block.

In FIG. 7, diagnostic-item selection means 551 selects a diagnostic item out of plural diagnostic items consecutively one by one for given cycles based on the diagnostic item management table 71 and the vehicle diagnostic program 72 each registered in the ROM card 7. Forced activation signal supplying means 550 supplies a forced activation signal Sx through the ECU 1 to a diagnostic target part 101 related to any one of diagnostic items ("EVP Diagnosis" or "Variable VT Diagnosis" in this embodiment) requiring a forced activation signal for execution of the diagnosis in the diagnostic items selected by the diagnostic item selection means 551. Vehicle-State detection means 552 detects through the vehicle-mounted ECU 1 a current state of each diagnostic target part 101 related to each diagnostic item selected by the diagnostic-item selection means 551.

Diagnostic means 553 compares the current state of the diagnostic target part 101 detected by the vehicle-state detection means 552 with a state predicted when the forced activation signal Sx is given, and judges the diagnostic target part 101 to be good when both states accord or an expected relation is established therebetween. The judgment result is displayed on the display 27. A counter 556 counts the number of diagnoses executed by the diagnostic means 553 for each diagnostic item. Supply stopping means 555 instructs the forced activation signal supplying means 550 to stop supplying the forced activation signal Sx when judging that the diagnostic target part 101 forcibly actuated by the forced activation signal Sx is good, or when the value of the counter 556 exceeds a predetermined value without judging the forcibly actuated diagnostic target part 101 to be good after scheduled time has elapsed. Then, when the forced activation signal for the diagnostic item is stopped by the supply stopping means 555, the forced activation signal supplying means 550 supplies another forced activation signal for any one of remaining diagnostic items instead of the previous one.

Figure 13:
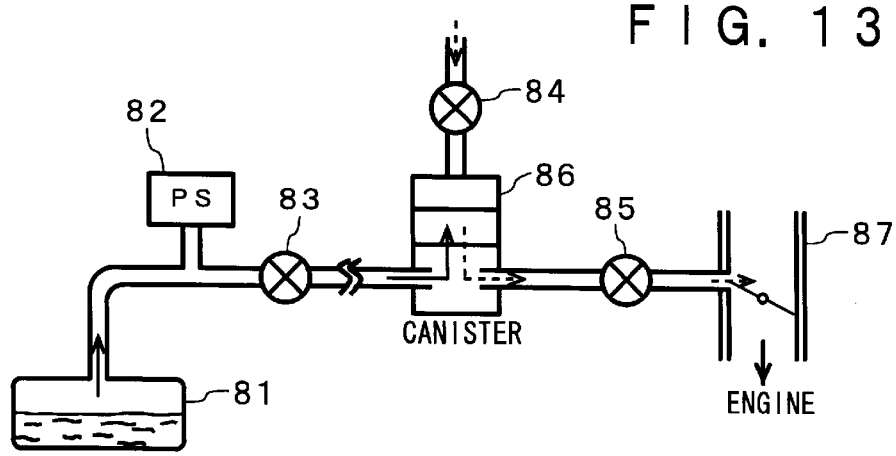
FIG. 13 is a block diagram of an evaporation system.

Referring now to the flowchart of FIG. 12 and the functional block diagram of FIG. 7, description will be made to a method of "EVP Diagnosis" related to the diagnostic item 3 according to the present invention. The "EVP Diagnosis" routine is to diagnose an evaporation system, as schematically illustrated in FIG. 13, for supplying the engine through a inspire pipe 87, when required conditions are satisfied during running of the vehicle, with fuel gas evaporated from fuel in a fuel tank 81 and collected in a canister 86.

In such an evaporation system, since the ECU 1 controls opening and closing of valves 83, 84 and 85, it is necessary to diagnose in the "EVP Diagnosis" routine whether or not each valve functions normally. The inspection process under limited conditions, however, makes it difficult to run the vehicle in such a manner that each valve in the evaporation system is normally actuated. In this regard, the embodiment is to send the forced activation signal from the ECU 1 to each valve such that each valve is forcibly opened or closed irrespective of the actual vehicle-running conditions. Then, pressure detected by a pressure sensor (PS) 82 is compared with pressure expected when each valve is opened or closed in accordance with the instruction of the forced activation signal. If both pressures accord, or an expected relation is established therebetween, each valve is diagnosed as being normal.

When the diagnostic-item selection means 551 selects the "EVP Diagnosis" of the step S400, it is judged in step S401 whether or not the diagnostic item is selected and said item has been judged to be passed, as is similar to the above, based on the values of the selection flag Fselc 3 and the pass flag Fpass 3 related to the diagnostic item 3. If the "EVP Diagnosis" is selected but has not passed yet, the processing advances to step S402, or otherwise, the operation advances to the next diagnostic processing. In step S402, a diagnosis stop flag Fstop 3 is referred to, and if the flag is set, the operation advances to the next diagnostic processing. If not set, the processing advances to step S403. The diagnosis stop flag Fstop 3 is set when the "EVP Diagnosis" has not passed after a predetermined number of executions or more has been done. Once the diagnosis stop flag Fstop 3 is set, the "EVP Diagnosis" is eliminated from the diagnostic targets.

In step S403, it is determined whether or not another forced activation signal for another diagnosis has already been sent from the ECU 1 to another diagnostic target part 101. Said another forced activation signal to be judged here is a forced activation signal supplied to a solenoid valve in the "Variable VT Diagnosis" routine in the present embodiment. If the determination at step S403 is negative, it is determined in step S404 whether or not the forced activation signal Sx for the "EVP Diagnosis" has already been sent out. If the determination is negative, in step S405, the forced activation signal supplying means 550 of FIG. 7 outputs an instruction to the ECU 1 in the "EVP Diagnosis" routine to output such a forced activation signal Sx as to open or close each valve 83-85 constituting the system. Then, the ECU 1 outputs the forced activation signal Sx to each valve 83–85 in accordance with the instruction.

In step S406, the value detected by the pressure sensor PS (FIG. 13) is read by the vehicle-state detection means 552. In step s407, the diagnostic means 553 makes a diagnosis of each valve based on whether or not the detected pressure value matches with a pressure value predicted from the state of each valve opened or closed by the forced activation signal Sx. If no t diagnos ed as being good, the counter 556 for counting the number of times the diagnosis is executed is incremented in step S411. Then, in step S412, it is determined whe ther or not the number of executions of the diagnosis exceeds a predetermined upper limit. If the determination is negative, the operation advances to the next diagnostic it em (the "Variable VT Diagnosis" in this embodiment) along the flowchart of FIG. 8, and the "EVP Diagnosis" routine is held until the next diagnostic timing.

In future EVP diagnosis routines, once the diagnostic result at step S407 becomes good, "1" is set in the diagnostic pass flag Fpass 3 in step S408, and the diagnostic item number "03" is erased from the display 27 in step S409. Then, in step S410, the supply stopping means 555 instructs the forced activation signal supplying means 550 to stop supplying the forced activation signal Sx for actuating the diagnostic target part 101.

The counter 556 for counting the number of times the diagnosis is executed is incremented in step S411, each time the diagnosis at step S407 does not show a good result in the subsequent EVP diagnosis routines. Then, when it is determined in step S412 that the counter value exceeds the upper limit, the diagnosis stop flag Fstop 3 is set in step S413 to prevent the diagnosis from hindering other diagnosis routines using other forced activation signals. In step S414, the supply stopping means 555 instructs the forced activation signal supplying means 550 to stop supplying the forced activation signal Sx for actuating the diagnostic target part 101.

In the embodiment, although the number of times the diagnosis is executed is counted so that the forced activation signal Sx will be stopped when the counter value exceeds the upper limit, the total diagnostic time may be counted instead so that the forced activation signal Sx will be stopped when the total diagnostic time exceeds an upper limit.

Referring next to the flowchart of FIG. 14 and the functional block diagram of FIG. 7, description will be made to a method of "Variable VT Diagnosis" related to the diagnostic item 4 according to the present invention. The "Variable VT Diagnosis" routine is to diagnose a function for switching the valve opening and closing timing or the amount of valve lift to either of high-speed and low-speed operations according to various conditions such as the vehicle-running speed and the engine speed.

The vehicle engine is generally provided with two types of cams different in shape for each cylinder. The valve opening and closing timing, and/or the amount of valve lift, is changed by switching the cam to be actuated. For example, a solenoid valve may serve to switch the destination to which oil pressure is to be supplied, thus switching the cam from one to the other and vice versa. The solenoid valve is controlled to supply the oil pressure to a high-speed hydraulic system when the high-speed cam is to be actuated, and to block the oil pressure to the high-speed hydraulic system when the low-speed cam is to be actuated. For this reason, in the "Variable VT Diagnosis" routine, it is determined whether or not the solenoid valve is controlled correctly in accordance with the instruction. Specifically, the determination is made based on whether or not a hydraulic responding switch provided in the hydraulic system is correctly opened or closed.

As is similar to the "EVP Diagnosis" routine, the inspection process under limited conditions, however, causes difficulties in continuing stable running at such a high speed as to switch the valve timing or the like for a period necessary to execute the diagnosis. In this regard, the embodiment is to send a forced activation signal from the ECU 1 to the solenoid valve so as to forcibly switch the cam irrespective of the actual vehicle-running conditions. Consequently, it is determined whether or not the pressure responding switch is actuated accurately to select the cam in accordance with the instruction on the basis of the pressure detected by the sensor.

When the diagnostic-item selection means 551 of FIG. 7 selects the "Variable VT Diagnosis," it is judged in step S501 whether or not the diagnostic item is selected and the item has been passed, as is similar to the above, based on the values of the selection flag Fselc 4 and the pass flag Fpass 4 related to the diagnostic item 4. If the "Variable VT Diagnosis" is selected, but has not passed yet, the processing advances to step S502, or otherwise, the operation advances the next diagnostic processing. In step S502, a diagnosis stop flag Fstop 4 is referred to, and if the flag is set, the operation advances to the next diagnostic processing. If not set, the processing advances to step S503. The diagnosis stop flag Fstop 4 is set in step S513, as will be described later, when the "Variable VT Diagnosis" has not passed after a predetermined number of executions has been done (or predetermined time has elapsed).

In step S503, it is determined whether or not another forced activation signal for another diagnosis has already been sent from the ECU 1 to another diagnostic target part 101. If the determination is negative, it is determined in step S504 whether or not a high-speed diagnostic flag Fhigh 4 is set. The high-speed diagnostic flag Fhigh 4 is set when the diagnosis for the high-speed cam is completed. At first, since the high-speed diagnostic flag Fhigh 4 is not set, the processing advances to step S505 in which it is determined whether or not the ECU 1 has already sent the forced activation signal Sx for actuating the solenoid valve so as to select the high-speed cam. If the determination is negative, the forced activation signal supplying means 550 outputs an instruction to the ECU 1 in step S506 to output the forced activation signal Sx.

In step S507, an opened or closed state of a pressure switch provided in the hydraulic system of the high-speed cam is detected. The pressure switch is designed to open its contact when oil pressure applied into the system is equal to or over a prescribed value. When the opened state is detected, therefore, the diagnostic means 553 diagnoses it as being good in step S508, and the processing advances to step S509 in which the high-speed diagnostic flag Fhigh 4 is set. Then, in step S510, the forced activation signal that has forcibly been actuated the solenoid valve to select the high-speed cam is stopped, while another forced activation signal for forcibly actuating the solenoid valve to select the low-speed cam is sent out.

When the opened state is not detected in the step S507, the diagnostic means 553 reaches a bad diagnostic result in step S508, and the processing advances to step S511. In step 511, the counter 556 for counting the number of times the "Variable VT Diagnosis" is executed is incremented in the same manner as in the above case. Then, in step S512, it is determined whether or not the number of executions of the diagnosis exceeds an upper limit. If not exceed the upper limit yet, the operation advances to the next diagnostic item (the "Ne Diagnosis" of diagnostic item 5 in this embodiment) along the flowchart of FIG. 8, and the "Variable VT Diagnosis" routine is held until the next diagnostic timing.

In the case where the forced activation signal for selecting the low-speed cam is output in step S510, the processing of FIG. 14 advances from step S504 to step S520 at the next diagnostic timing. In step S520, an opened or closed state of a pressure switch provided in the hydraulic system of the low-speed cam is next detected. Then, in step S521, the diagnosis is executed in the same manner. If not diagnosed as being good, the processing advances to step S511 in which the number of executions of the diagnosis is incremented. If diagnosed as being good, on the contrary, "1" is set in the diagnostic pass flag Fpass 4 in step S522, and the diagnostic item number "04" is erased from the display 27 in step S523. Then, in step S524, the supply stopping means 555 instructs the forced activation signal supplying means 550 to stop supplying the forced activation signal Sx.

The counter 556 that counts the number of times the diagnosis is executed is incremented each time the diagnosis at step S521 shows a bad result at any future diagnostic timing. Then, when it is determined in step S512 that the counter value exceeds the upper limit, "1" is set in the diagnosis stop flag Fstop 4 in step S513 in the same manner as in the above. Then, in step S514, the supply stopping means 555 instructs the forced activation signal supplying means 550 to stop supplying the forced activation signal Sx.

According to the embodiment described above, issue of a forced activation signal associated with a diagnostic item can be stopped not only when the diagnostic item is passed, but also after not passed for a predetermined period of time, so that continuous issue of the forced activation signal for the diagnostic item is prevented.

Thus, when plural diagnostic items require use of respective forced activation signals, a forced activation signal associated with a first diagnostic item is stopped and another forced activation signal for a second diagnostic item is supplied even if the first diagnosis has not passed yet after predetermined time has elapsed. This makes it possible to execute a diagnosis of a diagnostic item even if another diagnostic item is diagnosed as being bad.

The air fuel ratio of mixed gas or the combustion efficiency during the "EVP Diagnosis" or "Variable VT Diagnosis" routine is different from normal conditions, and this may hinder diagnoses for the other items that do not use any forced activation signal. In this regard, since the embodiment is to stop supplying the forced activation signal Sx properly in the above manner, the diagnostic items that may be hindered by use of the forced activation signal can be diagnosed without any restriction.

Figure 16:
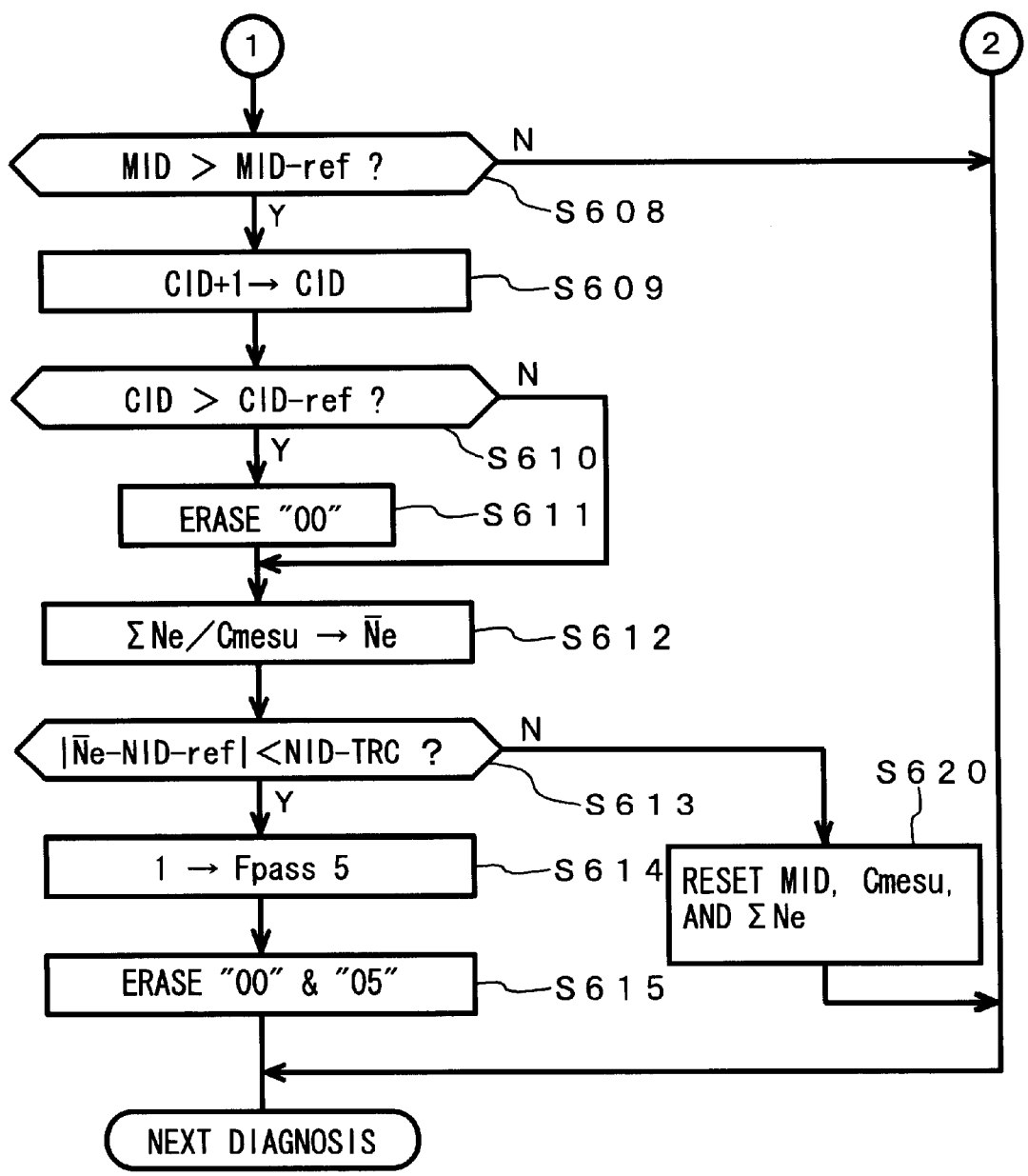

FIGS. 15 and 16 are flowcharts showing a method of the diagnostic item 5 "Ne Diagnosis" executed by the step S600 of FIG. 8. The "Ne Diagnosis" routine is to diagnose whether the engine speed at idling time is normal or abnormal, in which the engine speed Ne during the idling time is compared with a reference value (having the tolerance NID-TRC) to diagnose the engine speed Ne in accordance with the comparison result.

As similar to the above-mentioned diagnostic items, step S601 determines whether or not the diagnostic item 5 has been selected and the diagnosis has been passed based on the values of the diagnostic selection flag Fselc 5 and the diagnostic pass flag Fpass 5 related to the diagnostic item 5. If the "Ne Diagnosis" has been selected (Fselc 5=1) but not yet be passed (Fpass 5=0), the program advances to step S602. Otherwise, the program advances to a next diagnosis item.

The step S602 determines whether or not the engine is loaded. The engine is loaded when any of the electrical equipments are turned on or a power steering is operated. "Ne Diagnosis" s is judged to be passed when a difference between the detected idling speed Ne and a target value thereof is smaller than a predetermined reference value. However, the application of the load having the effect on the engine speed, such as an engine load or a electrical load, requires engine control so as to overcome the load, where the idling speed is set higher than usual, and this makes it difficult to diagnose the idling speed accurately. Therefore, the present embodiment has step S602 to determine whether the load is present or absent prior to the "Ne Diagnosis" . If the load is detected, the program advances to step S620 without execution of the Ne diagnosis, in which variables such as in a timer MID, a number of times of accumulating Cmesu, and an accumulated value ΣNe, which are described later, are reset. After that, the program advances to the next diagnosis item. On the other hand, if the load is not detected, the program advances to step S603, in which it is determined whether or not the idling of engine is stable. If not stable, the program advances to step S620, and if stable, it advances to step S604.

When the idling of engine is stable and the diagnosis starting conditions are satisfied, the step S604 judges an operating state of the timer MID. If the timer MID has not been started yet, it will be started. Step S605 increases the number of accumulation times Cmesu by 1 (one). In Step S606, the value of a current engine speed Ne is received from the ECU 1 and in step S607, the engine speed Ne detected in the current "Ne Diagnosis" cycle is added to the last accumulated value ΣNe. The resultant sum value is then registered as a new accumulated value ΣNe.

In the subsequent step S608 of FIG. 16, the value of timer or counter MID is compared with a reference idling measurement time MID-ref stored as a data piece of the standard data. If the value of the counter MID reaches the MID-ref, the measurement time required for the "Ne Diagnosis" is regarded as having already been elapsed and the program advances to step S609, in which the number of times of idling diagnoses CID is increased by 1 each time the idling diagnosis is executed. Then, step S610 compares the number of times of idling diagnoses CID with a predetermined reference number of times of idling diagnoses CID-ref stored as a data piece of the standard data.

If the number of times of idling diagnoses CID reaches the reference number of times of idling diagnoses CID-ref, the number of measurement times is regarded as being enough for the diagnosis. Therefore, step S611 erases the number "00" from the display 27. The subsequent step S612 divides the accumulated value ΣNe of the engine speed Ne by the number of times of accumulating Cmesu to calculate the average value of the engine speed Ne.

In step S613, an absolute value of a difference between the average value of the engine speed Ne and the unique data NID-ref is compared with the idling tolerance NID-TRC stored as a data piece of the standard data. If the absolute value is equal to, or smaller than the idling tolerance NID-TRC, the idling of engine is diagnosed as being normal and the program advances to step S614. On the other hand, if the absolute value exceeds the idling tolerance NID-TRC, the idling of engine can not be diagnosed as being not normal at this stage and the program advances to step S620. In the step S620, variables such as the timer MID, the number of times of accumulating Cmesu, and the accumulated value ΣNe are reset, and the program advances to the next diagnosis. The step S614 sets "1" as the diagnostic pass flag Fpass 3 related to the "Ne diagnosis", and the subsequent step S615 erases the diagnostic item number "05" (and the numbers "00" and "05" if "00" remains) from the display 27.

As previously described, the present embodiment accumulates the engine speed Ne detected as the "Ne diagnosis" routine is repeatedly executed, to calculate the average value of the engine speed based on the accumulated value ΣNe. Since the engine speed Ne is diagnosed based on whether or not the average value of the detected Ne's is within the reference range, the "Ne diagnosis" can be executed efficiently even using a diagnostic method of repeatedly circulating plural types of diagnoses for a very short period of each execution cycle.

Figure 17:
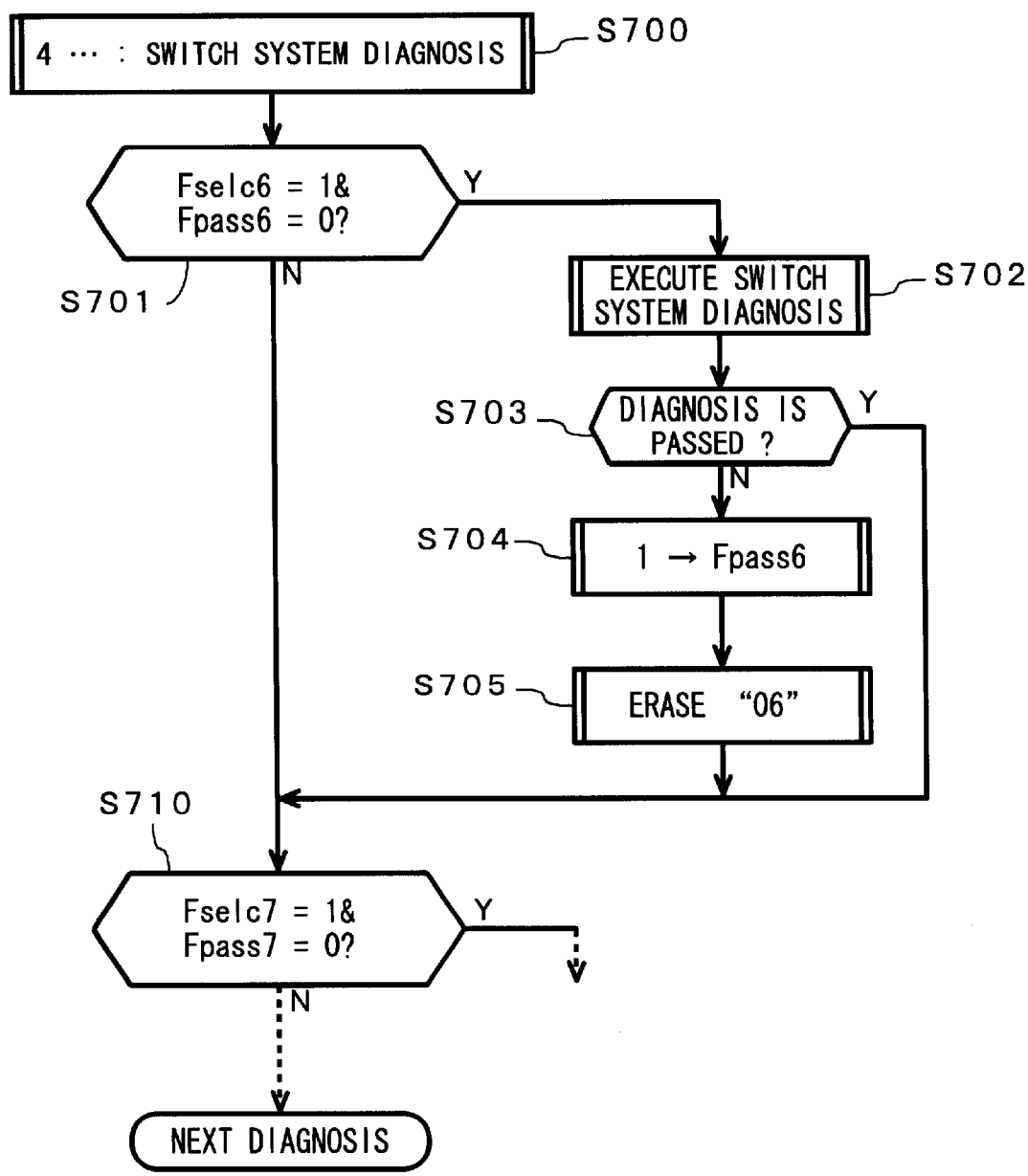
FIG. 17 is a flowchart showing an operation of each switch system diagnosis.

FIG. 17 is a flowchart showing a method of diagnosing each switch in a switch system, which is related to the diagnostic items 6, 7, ... to be executed by the step S700 of FIG. 8. In the "Switch system diagnosis", each switch is diagnosed as being passed when both of on- and off-states of the switch to be diagnosed are detected.

As similar to the above cases, step S701 determines whether or not the diagnostic item 6 has been selected and the diagnosis has been passed based on the values of the diagnostic selection flag Fselc 6 and the diagnostic pass flag Fpass 6 related to a "Brake Switch Diagnosis". If the "Brake Switch Diagnosis" is selected (Fselc 6=1) but not yet be passed (Fpass 6=0), the program advances to step S702 in which the diagnoses are conducted about both of on-and off-states of the brake switch. Step S703 determines whether the diagnosis is passed or failed. If both of the on-and off-states has passed, step S704 sets the diagnostic pass flag Fpass 6 to "1" and step S705 erases the diagnostic item number "06" from the display 27. If the judgments in the Steps 701 and 703 are negative, the program advances to step S710, in which the next switch diagnosis (diagnostic item 7) is executed. Similarly, other switches are diagnosed in the same manner as above mentioned, and respective numbers of the passed diagnostic items are erased from the display 27 in due order.

Figure 18:
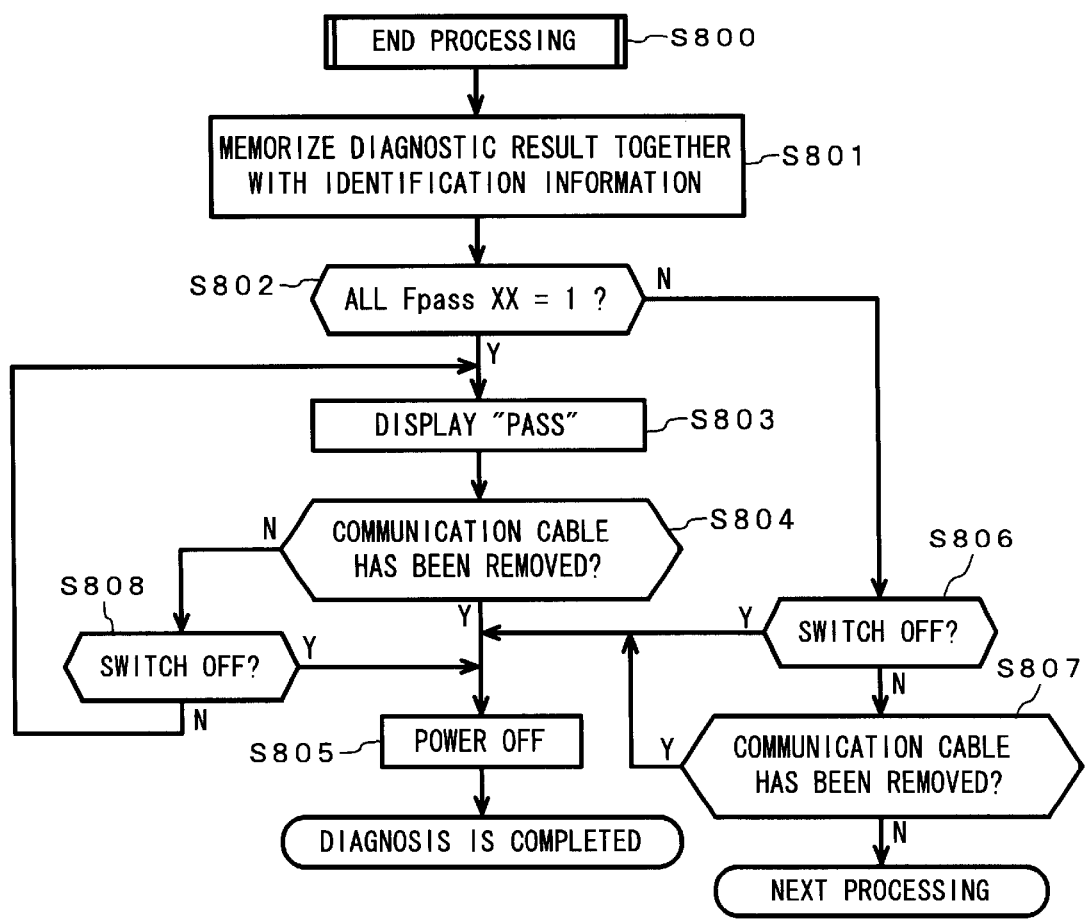
FIG. 18 is a flowchart showing an operation of an end processing.

FIG. 18 is a flowchart showing the "End Processing" (step S800) of FIG. 8. In the first step S801, the current diagnostic results, such as the number of the diagnostic item that each diagnosis has not been passed yet, are stored into the RAM 22 (FIG. 1) in correspondence with each individual identification code of the vehicle read in the step S114 of FIG. 9. The diagnostic results are rewritten or replaced by a new diagnostic results each time the step S501 is executed.

The RAM 22 shown in FIG. 1 is able to store the diagnostic results of plural vehicles in correspondence with respective identification codes. When the diagnostic results of plural vehicles, e.g., 50 or 60 vehicles, are stored, they are put into a single data set and transferred by radio through the transmitter 24 to the host machine, such as the host computer 30, automatically or by the operator manually selecting a "Transfer" from the menu on the display screen. In the host computer 30, a plurality of data sets, each representing the diagnostic results transferred in the plural data sets, are then incorporated into one unit and stored into the storage device 33. When storing data of predetermined units, e.g., for several hundreds vehicles, the data is memorized into a removable, portable storage medium such as an IC card or a floppy disk.

Such a batch processing in managing the diagnostic results of each individual vehicle makes it possible not only to improve the work efficiency of the operator, but also to simplify the process of taking statistics of the diagnostic results. It is therefore possible to analyze the diagnostic results and feed back the analysis result to the production process immediately.

The step S802 of FIG. 18 refers to all the diagnostic pass flags Epass XX to determine whether all the diagnostic items are passed or not. In the case where all the diagnostic pass flags Fpass XX are set to "1", step S803 makes the display indicate a word "Pass", as shown in FIG. 6F, to inform the operator that all the diagnoses are completed. Step S804 determines whether or not the communication cable 5 has been removed from the ECU 1, and if removed, the vehicle diagnostic apparatus 2 is turned off in step S805. On the other hand, if not removed, step S808 determines whether or not the power has been inactivated by the operator's turning off the power-off key switch. After the key operation by the operator, the program advances to step S805. Otherwise, the program returns to the step S803.

In the case where at least one of the diagnostic items, e.g., the diagnostic item 2, is not judged to be passed in the step S802, the program advances to step S806. In this case, since the number "02" remains on the display 27, as shown in FIG. 6C, the operator can easily recognize that only the diagnostic item 2 has not been passed yet.

When the diagnostic item number "05" related to the "Ne Diagnosis" remains on the display 27, as shown in FIGS. 6D and 6E, the validity of the fail result in the diagnostic item 5 are judged based on whether or not the number "00" remains on the display 27. As previously described by referring to the steps S610 and S611 of FIG. 16, the indication of "00" is erased when the diagnosis starting conditions for the diagnostic item 5, such as the conditions that the engine is warmed up adequately without any load, are satisfied, and the number of times the Ne diagnosis is executed (CID) exceeds a given number (CID>CID-ref). If the indication of "00" remains, as shown in FIG. 6D, therefore, it means that the diagnostic condition is not satisfied yet. Thus, the operator do not immediately judge the diagnostic item 5 to be bad or failed, but further execute the Ne diagnosis. If the numbers "00" and "05" are erased after that the diagnostic item 3 is judged to be passed.

In the case where the number "00" has already been erased, as shown in FIG. 6 E, the operator immediately judges the diagnostic item 3 to be failed because the diagnostic item 5 has not been passed yet in spite of the situation that the preconditions are satisfied and the number of times of diagnoses (CID) reaches an adequate value.

As described above, with the diagnostic item requiring certain preconditions to be satisfied before starting the diagnosis, the vehicle diagnostic apparatus 2 in the present embodiment displays a fail number (an unsatisfied precondition sign) "00" indicated when the preconditions are not satisfied. In the case where such a fail number "00" appears on the display, therefore, the operator can easily recognize that the fail result of the diagnostic item is caused by unsatisfied preconditions even when the diagnostic item has not been passed yet, thus eliminating an error of fail judgment on a diagnostic item that may be passed.

The step S806 determines whether or not the operator has turned off the power switch. If the power switch has been turned off, the program advances to step S805 to turn off the diagnostic apparatus 2. If the power switch has not been turned off, step S807 determines whether or not the communication cable 5 has been removed from the ECU 1. If removed, the program advances to the step S805, in which the vehicle diagnostic apparatus 2 is turned off. If not removed, the program advances to the next process to continue this vehicle diagnostic program.

Figure 19:
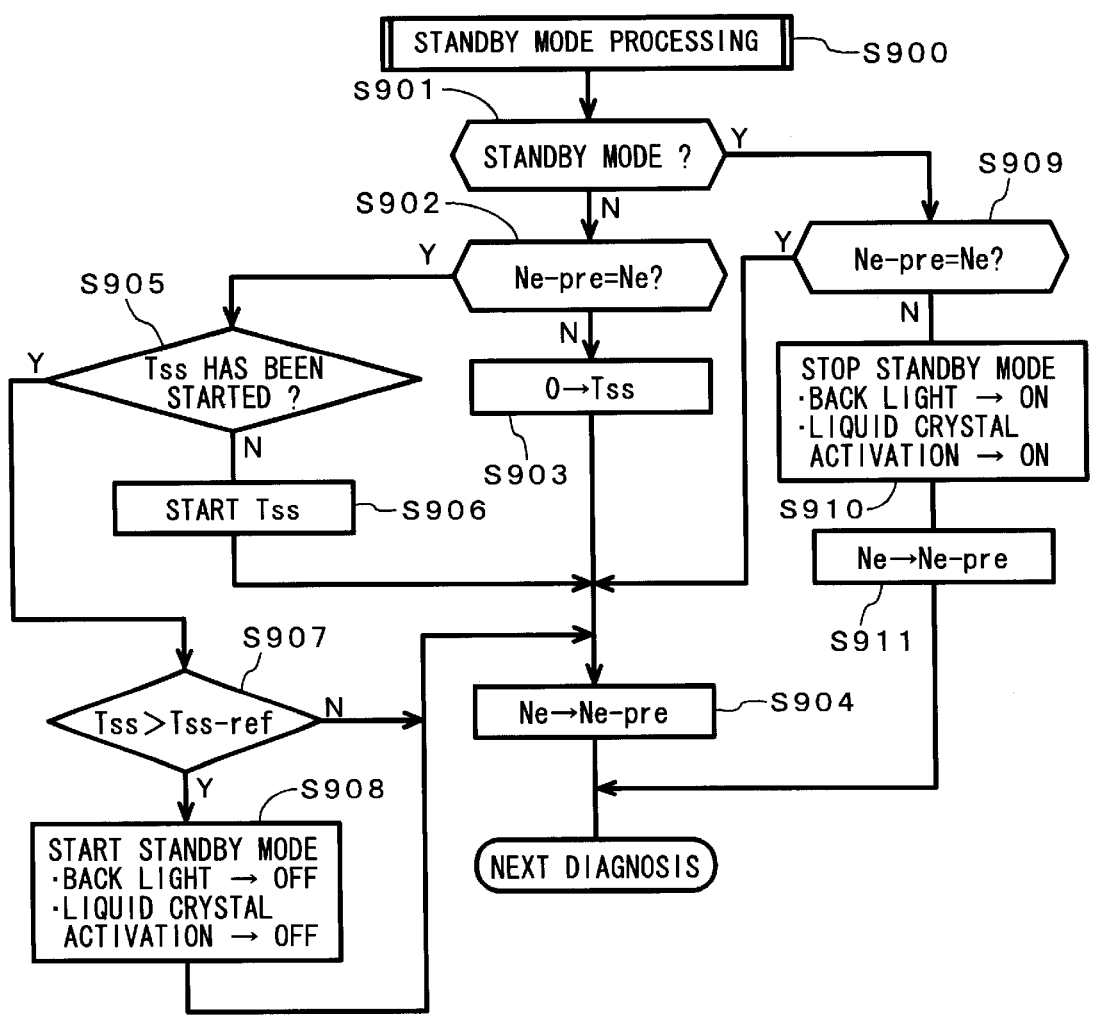
FIG. 19 is a flowchart showing an operation of a standby mode processing.

FIG. 19 is a flowchart showing an operation of a "Standby Mode Processing" to be executed by the step S900 of FIG. B. The first step S901 in FIG. 16 determines whether or not the vehicle diagnostic apparatus 2 is in a diagnostic mode. Since it is in the standby mode in the first execution cycle, the program advances to step S902. The step S902 compares the previously-detected engine speed Ne-pre with a currently-detected engine speed Ne. If the diagnostic process is being executed, i.e., if the engine is running, since the engine speed must slightly fluctuate even in an idling state, both data on the engine speed are usually judged to be not equal. After the judgment, the program advances to step S903, in which a standby mode timer Tss is reset. The subsequent step S904 newly registers the currently-detected engine speed Ne as the previous engine speed Ne-pre, and the program advances to the next diagnosis item which is the "Vehicle Speed Sensor" diagnosis in the present embodiment.

Once the operator has stopped the engine such as for taking a rest, since the judgement in Step S902 is affirmative, the program advances to step S905. The step S905 determines whether or not the timer Tss is started counting. Since the timer Tss is not started counting in the first execution cycle, the program advances to step S906, in which the timer Tss is set to start.

After starting the standby timer Tss, since an affirmative judgement is obtained in the step S905, the program advances from the step S905 to step S907. The step S907 compares the count value of the timer Tss with a standby mode starting condition Tss-ref stored as a data piece of the standard data. If the count value exceeds the starting condition Tss-ref (i. e., when the engine stop judgement is continuously obtained for a predetermined period of time in Step S902), step S908 switches the operation mode from the diagnostic mode to the standby mode to turn off the back light of the display 27 and inactivate the liquid crystal. Further, a sequence of diagnostic processes that have been done until then are temporarily stored into the RAM 22.

Once starting the standby mode, the program advances from the step S901 to step S909 which compares the current engine speed Ne with the previous engine speed Ne-pre. During a recess, since both data on the engine speed always agree with each other without fail, and an affirmative judgement is obtained in the step S909, the standby mode is maintained. When the engine is restarted after the recess, since both data on the engine speed are judged to be not equal in the step S909, the program advances to step S910. The step S910 switches the operation mode from the standby mode to the diagnostic mode to turn on the back light of the display 27 and activate the liquid crystal. At the same time, the diagnostic history at starting of the standby mode is read out from the RAM 22, and the display contents just before starting the standby mode are reproduced on the display 27.

Then, step S911 newly registers the currently-detected engine speed Ne as the previous engine speed Ne-pre. After that, the program returns to the "Vehicle Speed Sensor Diagnosis" described with reference to FIG. 10. A sequence of the above diagnosis routines are then repeatedly circulated as shown in FIG. 8.

The procedure shown in FIG. 19 may be modified as follows: (1) the processing shifts from step S908 to S901; (2) the processing shifts to step S901 when the judgment at step S909 is affirmative; and (3) the processing shift from step S910 to step S904 without passing through step S911.

As previously described, according to the embodiment, switching from the diagnostic mode to the standby mode is automatically done when the variation of engine speed is no longer detected, while switching from the standby mode to the diagnostic mode is automatically done when a change in engine speed is detected. Therefore, the operator has only to stop the engine when stopping the vehicle diagnosis temporarily for taking a rest, or to restart the engine when restarting the vehicle diagnostic program after the recess, without any other operation required. This allows the operator to be released from an excess load at switching from the diagnostic mode to the standby mode, and vice versa.

In the embodiment, each diagnosis routine must be executed during an interval after the operator starts an operation for each individual diagnosis until completing the operation. To take the "Brake Switch Diagnosis" by way of example, the "Brake Switch Diagnosis" routine must be executed while the operator operates (steps on) the brake pedal. It is therefore desirable to repeatedly circulate the sequence of diagnosis routines at such a speed as to execute at least one cycle of the diagnoses related to all the diagnostic items during the operation.

In the embodiment described above, a list of all the diagnostic items is first displayed, and then diagnostic item numbers judged to be passed are erased from the display in due order, whereby a diagnostic item number or numbers remaining on the display at the end of execution of the vehicle diagnostic program are judged to be failed. On the contrary, the diagnostic technique according to the present invention may be comprised such that the diagnostic items are added onto the display in order that they are judged to be passed, whereby a diagnostic item number or numbers that have not appeared on the display at the end of execution of the vehicle diagnostic program are judged to be failed. Similarly, although the indication "00" is erased when the diagnostic item 5 has been diagnosed adequately in the embodiment described above, it may appear on the display when the diagnostic item 5 is diagnosed adequately.

Although the embodiment described the vehicle diagnostic method and apparatus for use at a factory, such as in the "inspection process" on the production line, the present invention is not limited by the embodiment and may also be applied to vehicle diagnostic method and apparatus used under any other environments, such as at an auto repair shop.

According to the present invention, because issue of a forced activation signal associated with a diagnostic item is stopped not only when the diagnostic item is passed, but also when it is not passed after a predetermined period of time has elapsed, the following advantages can be accomplished.

(1) When plural diagnostic items require use of respective forced activation signals, a forced activation signal associated with a diagnostic item is stopped and another forced activation signal for another diagnostic item is supplied even if the previous diagnosis has not passed yet after predetermined time has elapsed. This makes it possible to issue said another forced activation signal for diagnosis of the another diagnostic item even if the previous diagnostic item is failed.

(2) The diagnostic items that may be hindered during issue of a forced activation signal can be diagnosed without any restriction, because issue of such forced activation signal is stopped as appropriate even in an application in which use of any forced activation signal is unnecessary for some diagnostic items, but execution of diagnoses for such diagnostic items is disabled during issue of the forced activation signal for other diagnostic item.

What is claimed is:

1. A vehicle diagnostic method for repeatedly circulative execution of diagnoses for plural items, in which a diagnostic item or items that have been judged to be passed are removed in order from diagnostic targets while continuously circulative execution of diagnoses for remaining items, and a forced activation signal for at least one diagnostic item selected from the plural diagnostic items is issued so that a target part related to the diagnostic item will show an expected state, wherein the diagnostic item is judged to be good or bad based on whether or not an actual state of the target part is in the expected state, said method comprising the steps of:

circulatively executing every diagnostic item without failing execution of a diagnosis for the diagnostic item corresponding to the forced activation signal while being supplied; and stopping issue of the forced activation signal either when the corresponding item is judged to be good or when predetermined time for execution of the diagnosis has elapsed.

2. The method according to claim 1, wherein said forced activation signal is continuously issued during at least one cycle of diagnoses for every diagnostic item to be executed at that moment.

3. The method according to claim 1, wherein at least first and second diagnostic items require issue of respective forced activation signals for their diagnoses, and issue of a second forced activation signal for the second diagnostic item is started after issue of a first forced activation signal for the first diagnostic item has been stopped.

4. A diagnostic apparatus for repeatedly circulative execution of diagnoses for plural items, in which a diagnostic item or items that have been judged to be passed are removed in order from diagnostic targets while continuously circulative execution of diagnoses for remaining items, said apparatus comprising:

diagnostic-item selection means for selecting a diagnostic item out of plural diagnostic items consecutively one by one for given cycles;

state detection means for detecting a current state of a diagnostic target part related to a selected diagnostic item;

diagnostic means for comparing the detected current state of the diagnostic target part with an expected state thereof to judge the diagnostic target part to be good when both states accord or an expected relation is established therebetween;

forced activation signal issuing means for issuing such a forced activation signal as to actuate a diagnostic target part related to at least one predetermined diagnostic item to be an expected state; and supply stopping means for stopping issue of the forced activation signal either when judging that the diagnostic target part corresponding to the forced activation signal has passed the diagnosis, or after the forced activation signal has been continuously supplied to the diagnostic target part for a predetermined period of time.

5. The apparatus according to claim 4, wherein said forced activation signal is continuously issued during at least one cycle of diagnoses for every diagnostic item to be executed at that moment.

6. The apparatus according to claim 4, wherein the forced activation signal issuing means comprising at least first and second forced activation signal supplying means for issuing a first and a second forced activation signal, respectively; and further comprising means for controlling the second forced activation signal supplying means to start issuing the second forced activation signal after the first forced activation signal supplying means has stopped supplying the first forced activation signal.

7. The method according to claim 2, wherein at least first and second diagnostic items require issue of respective forced activation signals for their diagnoses, and issue of a second forced activation signal for the second diagnostic item is started after issue of a first forced activation signal for the first diagnostic item has been stopped.

8. The apparatus according to claim 5, wherein the forced activation signal issuing means comprising at least first and second forced activation signal supplying means for issuing a first and a second forced activation signal, respectively; and further comprising:

means for controlling the second forced activation signal supplying means to start issuing the second forced activation signal after the first forced activation signal supplying means has a stopped supplying the first forced activation signal.

* * * * *